United States Patent
Tsubota et al.

(10) Patent No.: US 8,092,889 B2
(45) Date of Patent: Jan. 10, 2012

(54) SILVER ALLOY REFLECTIVE FILM FOR OPTICAL INFORMATION STORAGE MEDIA, OPTICAL INFORMATION STORAGE MEDIUM, AND SPUTTERING TARGET FOR THE DEPOSITION OF SILVER ALLOY REFLECTIVE FILM FOR OPTICAL INFORMATION STORAGE MEDIA

(75) Inventors: Takayuki Tsubota, Kobe (JP); Takeshi Ohwaki, Kobe (JP); Hideo Fujii, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 303 days.

(21) Appl. No.: 12/438,964

(22) PCT Filed: Aug. 28, 2007

(86) PCT No.: PCT/JP2007/066683
§ 371 (c)(1),
(2), (4) Date: Feb. 26, 2009

(87) PCT Pub. No.: WO2008/026601
PCT Pub. Date: Mar. 6, 2008

(65) Prior Publication Data
US 2010/0015381 A1    Jan. 21, 2010

(30) Foreign Application Priority Data

Aug. 28, 2006 (JP) ................................. 2006-230930
Oct. 25, 2006 (JP) ................................. 2006-290238

(51) Int. Cl.
*B32B 3/02* (2006.01)
(52) U.S. Cl. .................. 428/64.1; 428/64.4; 430/270.12

(58) Field of Classification Search ................. 428/64.4; 430/270.12
See application file for complete search history.

(56) References Cited

U.S. PATENT DOCUMENTS

| | | |
|---|---|---|
| 5,948,497 A | 9/1999 | Hatwar et al. |
| 6,007,889 A | 12/1999 | Nee |
| 6,229,785 B1 | 5/2001 | Kitaura et al. |
| 6,280,811 B1 | 8/2001 | Nee |
| 6,451,402 B1 | 9/2002 | Nee |

(Continued)

FOREIGN PATENT DOCUMENTS

JP     4 28032     1/1992

(Continued)

OTHER PUBLICATIONS

U.S. Appl. No. 11/748,739.

(Continued)

*Primary Examiner* — Elizabeth Mulvaney
(74) *Attorney, Agent, or Firm* — Oblon, Spivak, McClelland, Maier & Neustadt, L.L.P.

(57) ABSTRACT

A silver alloy reflective film for optical information storage media, which can maintain superior environmental resistance, such as high hygrothermal resistance and high light stability, over the long term even when the metal reflective film is in direct contact with a resin layer. An optical information storage medium includes the reflective film and a sputtering target deposits the reflective film. The silver alloy reflective film includes one or more specific elements selected from Pr, Ho, Yb, Sm, Er, Tm, and Tb, to suppress deterioration occurring when the silver alloy reflective film is in direct contact with a resin layer, where silver in the reflective film migrates and aggregates into the adjacent resin layer.

19 Claims, 1 Drawing Sheet

U.S. PATENT DOCUMENTS

| | | |
|---|---|---|
| 6,689,444 B2 | 2/2004 | Nakai et al. |
| 7,022,384 B2 | 4/2006 | Fujii et al. |
| 7,033,730 B2 * | 4/2006 | Lichtenberger et al. . 430/270.11 |
| 7,203,003 B2 | 4/2007 | Nakai et al. |
| 7,419,711 B2 | 9/2008 | Tauchi et al. |
| 7,452,604 B2 | 11/2008 | Takagi et al. |
| 2002/0034603 A1 | 3/2002 | Nee |
| 2002/0122913 A1 | 9/2002 | Nee |
| 2002/0150772 A1 | 10/2002 | Nakai et al. |
| 2003/0138591 A1 | 7/2003 | Nee |
| 2003/0215598 A1 | 11/2003 | Nee |
| 2004/0018334 A1 | 1/2004 | Nee |
| 2004/0028912 A1 | 2/2004 | Tauchi et al. |
| 2004/0151866 A1 | 8/2004 | Nee |
| 2004/0151867 A1 | 8/2004 | Nee |
| 2004/0174791 A1 * | 9/2004 | Saito ............ 369/59.25 |
| 2004/0191463 A1 | 9/2004 | Nee |
| 2004/0226818 A1 | 11/2004 | Takagi et al. |
| 2004/0238356 A1 | 12/2004 | Matsuzaki et al. |
| 2004/0258872 A1 | 12/2004 | Nee |
| 2005/0042406 A1 | 2/2005 | Nee |
| 2005/0112019 A1 | 5/2005 | Nakai et al. |
| 2005/0153162 A1 | 7/2005 | Takagi et al. |
| 2005/0170134 A1 | 8/2005 | Nee |
| 2005/0238839 A1 | 10/2005 | Takagi et al. |
| 2005/0287333 A1 * | 12/2005 | Takagi et al. ......... 428/64.4 |
| 2006/0013988 A1 | 1/2006 | Tauchi et al. |
| 2006/0104853 A1 | 5/2006 | Tauchi et al. |
| 2006/0154104 A1 | 7/2006 | Tauchi et al. |
| 2006/0171842 A1 | 8/2006 | Tauchi et al. |
| 2006/0177768 A1 | 8/2006 | Tauchi et al. |
| 2006/0182991 A1 | 8/2006 | Tauchi et al. |
| 2006/0234001 A1 | 10/2006 | Tauchi et al. |
| 2007/0020139 A1 | 1/2007 | Tauchi et al. |
| 2007/0020426 A1 | 1/2007 | Nakai et al. |
| 2007/0020427 A1 | 1/2007 | Fujii et al. |
| 2007/0141296 A1 | 6/2007 | Nakano et al. |
| 2008/0075910 A1 | 3/2008 | Ohwaki et al. |
| 2008/0131308 A1 | 6/2008 | Tsubota et al. |
| 2008/0317993 A1 | 12/2008 | Tauchi et al. |

FOREIGN PATENT DOCUMENTS

| | | |
|---|---|---|
| JP | 4 252440 | 9/1992 |
| JP | 5 258363 | 10/1993 |
| JP | 6 208732 | 7/1994 |
| JP | 6 302027 | 10/1994 |
| JP | 2000 57627 | 2/2000 |
| JP | 2001 184725 | 7/2001 |
| JP | 2002 15464 | 1/2002 |
| JP | 2003 160826 | 6/2003 |
| JP | 2004 139712 | 5/2004 |
| JP | 2004 158145 | 6/2004 |
| JP | 2005 146419 | 6/2005 |
| JP | 2006 48899 | 2/2006 |
| WO | 98 09823 | 3/1998 |

OTHER PUBLICATIONS

U.S. Appl. No. 12/167,597, filed Jul. 3, 2008, Takagi, et al.
U.S. Appl. No. 12/183,700, filed Jul. 31, 2008, Tauchi, et al.
U.S. Appl. No. 12/198,520, filed Aug. 26, 2008, Tauchi, et al.
U.S. Appl. No. 12/261,781, filed Oct. 30, 2008, Matsuzaki, et al.

* cited by examiner

SILVER ALLOY REFLECTIVE FILM FOR OPTICAL INFORMATION STORAGE MEDIA, OPTICAL INFORMATION STORAGE MEDIUM, AND SPUTTERING TARGET FOR THE DEPOSITION OF SILVER ALLOY REFLECTIVE FILM FOR OPTICAL INFORMATION STORAGE MEDIA

TECHNICAL FIELD

The present invention relates to silver alloy reflective films for optical information storage media; optical information storage media including the silver alloy reflective films; and sputtering targets for the deposition of the silver alloy reflective films. As used herein a "reflective film" generically inclusively refers to a reflective film and a semi-reflective film. The technique according to the present invention is particularly superior in environmental resistance such as light stability and hygrothermal resistance and is advantageous when applied to reflective films where the environmental resistance is desired; optical information storage media using the reflective films; and sputtering targets for the deposition of the reflective films.

BACKGROUND ART

Silver alloy reflective film materials, as reflective films typically for optical discs (hereinafter also referred to as "optical information storage media"), show superior properties than other materials, such as high reflectivity, high transmittance, low absorptivity [absorptivity=100%−(reflectivity+transmittance)], and high thermal conductivity.

However, it has been an important technological issue to improve long-term reliability in optical discs using these silver alloy reflective films, so as to maintain these superior properties over the long term. The long-term reliability is most affected by environmental resistance, such as hygrothermal resistance and light stability, of silver alloy reflective films, and thus the environmental resistance should be improved.

Typically, when an optical disc is used in higher temperatures and humidity surroundings, silver (Ag) becomes more liable to migrate (diffuse) and aggregate from the silver alloy reflective film to a resin layer arranged in contact with the reflective film. The diffusion and aggregation of silver causes increased surface roughness and/or loss of the continuity of the silver alloy reflective film to reduce the reflectivity, and this remarkably impedes functions as a reflective film or semi-reflective film.

When an optical disc is used under such conditions as to be irradiated with ultraviolet rays are applied typically from fluorescent lamps, the light irradiation also makes silver more liable to migrate (diffuse) and aggregate from the silver alloy reflective film to a resin layer arranged in contact with the reflective film. The diffusion and aggregation of silver in turn causes reduction in reflectivity, and at the time when the reduced reflectivity reaches the lower limit of reflectivity for the detection of regenerative signals, it becomes difficult to regenerate signals.

Various techniques have been proposed for improving properties of reflective films by allowing silver with specific rare-earth elements or by improvements of silver alloys. Typically, there have been proposed silver alloy reflective films containing, for example, Ag—Cu—Au—(Nd, Sn, Ge) and silver alloy reflective films containing Ag—(Bi, Sb)—(Cu, Au), or Ag—(Bi, Sb)-(rare earth element: Nd, Y)—(Cu, Au) (see Patent Documents 1 and 2).

There has been also proposed a technique of reducing the thermal conductivity of a silver alloy in a reflective film, so as to carry out laser marking at a lower power. Specifically, Ge, Si, Sn, Pb, Ga, In, Tl, Sb, and/or Bi is added to silver (Ag) to reduce the thermal conductivity (see Patent Document 3). Likewise, there has also been proposed a technique of adding Cr, Ti, Si, Ta, Nb, Pt, Ir, Fe, Re, Sb, Zr, Sn, and/or Ni to silver to reduce the thermal conductivity (see Patent Document 4).

These reflective films composed of known silver alloys, however, are not intended to improve environmental resistance such as hygrothermal resistance and light stability. Additionally, such reflective films composed of known silver alloys are liable to deteriorate in the environmental resistance when the metal reflective films (silver alloy reflective films) are each in direct contact with an ultraviolet-curable resin layer or organic dye recording layer in optical information storage media, as described below.

As a possible solution to avoid reduction in environmental resistance of a silver alloy reflective film when the metal (silver alloy) reflective film is in direct contact with an ultraviolet-curable resin layer or organic dye recording layer, a Li-containing silver alloy reflective film has been proposed (Patent Document 5). More specifically, this document proposes a silver alloy containing 0.01 to 10 atomic percent of Li. Additionally, this document discloses that the silver alloy may further selectively contain 0.005 to 0.8 atomic percent of Bi; a total of 0.1 to 2 atomic percent of rare-earth metal elements (Sc, Y, La, Ce, Pr, Nd, Pm, Sm, Eu, Gd, Tb, Dy, Ho, Er, Tm, Yb, and Lu); and/or a total of 0.1 to 3 atomic percent of one or more element selected from Cu, Au, Rh, Pd, and Pt.

[Patent Document 1] Japanese Unexamined Patent Application Publication (JP-A) No. 2002-15464
[Patent Document 2] JP-A No. 2004-139712
[Patent Document 3] JP-A No. 1992-252440
[Patent Document 4] JP-A No. 1992-28032
[Patent Document 5] JP-A No. 2006-48899

DISCLOSURE OF INVENTION

Problems to be Solved by the Invention

However, the present inventors found that the reflective film of Li-containing silver alloy disclosed in Patent Document 5 is still insufficient to provide satisfactory environmental resistance, such as hygrothermal resistance and light stability, of optical discs, even when it further contains Bi, rare-earth metal elements, and/or noble metal elements such as Cu and Au. This is because the target optical discs are used for a longer period of time than that assumed in this document. Specifically, although the reflective film of Li-containing silver alloy shows improved environmental resistance, the environmental resistance will reduce within a relatively short time to fail to maintain superior environmental resistance, such as high hygrothermal resistance and high light stability, over the long term.

This is mainly because a test for evaluation of environmental resistance such as hygrothermal resistance and light stability is conducted within an excessively short time in Patent Document 5. Data obtained in the test for the evaluation conducted in an excessively short time may not have precise correlation to the environmental resistance of optical discs when actually used over the long term.

By way of example, in the technique disclosed in Patent Document 5, the light stability is evaluated by measuring rates of change in spectral reflectivity and spectral transmittance of an assembly of a deposited silver alloy thin film and an ultraviolet-curable resin film arranged on the silver alloy thin film in irradiation tests with ultraviolet and visible rays. However, the irradiation is conducted under conditions at an illumination of 120 W/m² and a temperature of 80° C. for an irradiation time (test period) of 144 hours, but the irradiation test period is too short.

In the technique disclosed in Patent Document 5, the aggregation resistance (hygrothermal resistance) is evaluated on an assembly of a deposited silver alloy thin film and an ultraviolet-curable resin film arranged on the silver alloy thin film in tests conducted under high temperatures and humidity conditions at a temperature of 80° C. and relative humidity of 90% for a holding time of 48 hours, but the holding time in the test is too short.

Accordingly, demands have been made to improve environmental resistance so as to maintain superior environmental resistance, such as high hygrothermal resistance and high light stability, over the long term even when the silver alloy reflective film is in direct contact with the resin layer in an optical disc using the silver alloy reflective film.

The present invention has been made while focusing attention on these circumstances, and an object of the present invention is to provide: a silver alloy reflective film for optical information storage media, which reflective film can maintain superior environmental resistance, such as high hygrothermal resistance and high light stability, over the long term even when the metal reflective film is in direct contact with the resin layer; an optical information storage medium including the reflective film; and a sputtering target for the deposition of the reflective film.

Means for Solving the Problems

To achieve the objects, the present invention provides a silver alloy reflective film with superior environmental resistance for use in optical information storage media. This silver alloy reflective film contains a total of 0.1 to 5 atomic percent of one or more elements selected from Pr, Ho, Yb, Sm, Er, Tm, and Tb, with the remainder being silver and inevitable impurities.

More specifically, in an embodiment of the silver alloy reflective film, the one or more elements are selected from Pr, Ho, and Yb. In another embodiment of the silver alloy reflective film, the one or more elements are selected from Sm, Er, Tm, and Tb.

For further satisfactory environmental resistance, the silver alloy reflective film preferably further contains 0.01 to 1 atomic percent of Bi and/or a total of 0.3 to 5 atomic percent of either one or both of Cu and Au.

To achieve the objects, the present invention also provides an optical information storage medium including any of the silver alloy reflective films according to the embodiment or the above- or below-mentioned preferred embodiments. In a preferred embodiment, the optical information storage medium is an optical information storage medium which includes a transparent substrate, a metal reflective film layer as the silver alloy reflective film, and an ultraviolet-curable resin layer or organic dye recording layer in direct contact with the metal reflective film layer and should thereby particularly desirably have superior environmental resistance.

Additionally, there is also provided a sputtering target for the deposition of the silver alloy reflective film. The sputtering target has the same as or similar to the composition of a silver alloy reflective film according to the embodiment or the above- or below-mentioned preferred embodiments.

More specifically, there is provided a sputtering target which contains a total of 0.1 to 5 atomic percent of one or more elements selected from Pr, Ho, Yb, Sm, Er, Tm, and Tb, with the remainder being silver and inevitable impurities. In a preferred embodiment, the sputtering target further contains 0.01 to 1.5 atomic percent of Bi. In another preferred embodiment, the sputtering target further contains a total of 0.3 to 5 atomic percent of either one or both of Cu and Au. In yet another preferred embodiment, the sputtering target is used for the deposition of a silver alloy reflective film for use in optical information storage media.

Advantages

As used herein, an "improvement in environmental resistance" refers to maintenance of superior environmental resistance, such as high hygrothermal resistance and high light stability, over the long term. This advantage is exhibited herein by configuring silver alloy reflective films for use in optical information storage media to be silver alloy reflective films containing specific selected elements (Pr, Ho, Yb, Sm, Er, Tm, and/or Tb).

In the silver alloy reflective films containing these specific selected elements, silver in the reflective film or semi-reflective film is suppressed from migrating and aggregating into an adjacent resin layer such as an ultraviolet-curable resin layer or organic dye recording layer, thus preventing deterioration. The silver alloy reflective films according to the present invention have improved environmental resistance including both high hygrothermal resistance and high light stability and can thereby maintain superior environmental resistance including high hygrothermal resistance and high light stability over the long term.

Typically, as seen in a cross-sectional structure, an actual read-only optical disc is formed by depositing a silver alloy reflective film on a polycarbonate (hereinafter also simply referred to as "PC") substrate, applying an ultraviolet (UV) curable resin layer on the reflective film via spin coating, and affixing another PC substrate (herein after also referred to as "substrate") thereto. A write-once optical disc is prepared by applying an organic dye recording layer on a PC substrate via spin-coating, depositing a silver alloy reflective film on the recording layer, applying an ultraviolet (UV) curable resin layer on the reflective film via spin-coating, and affixing another PC substrate thereto.

There is another type of optical discs in which two plies of the above structure are affixed with each other to give an optical disc having two recording layers so as to have a higher recording capacity. Specifically, a read-only optical disc of this type is prepared by depositing a silver alloy semi-reflective film on a substrate, applying an ultraviolet (UV) curable resin layer on the reflective film via spin-coating, and affixing the resulting article with another substrate bearing a deposited silver alloy or aluminum alloy reflective film to give an assembly. Likewise, a write-once optical disc of this type is prepared by affixing a multilayer structure of a PC substrate, an organic dye recording layer arranged on the PC substrate, and a silver alloy semi-reflective film deposited on the recording layer with another multilayer structure of a substrate, a silver alloy reflective film and an organic dye recording layer deposited thereon, to give an assembly; or by sequentially stacking an organic dye recording layer and a silver alloy reflective film on a multilayer structure of a PC substrate, an organic dye recording layer arranged on the PC substrate, and a silver alloy semi-reflective film deposited on the recording layer.

As has been described, optical discs, in which a silver semi-reflective film or a silver fully reflective film (herein after both are also generically simply referred to as "silver reflective film") is in direct contact with the resin layer, may suffer from deterioration of the silver reflective film such that silver migrates and aggregates from the reflective film into the resin layer both under moist heat conditions and under light irradiation conditions. In other words, the deterioration, where silver in the reflective film migrates and aggregates into the resin layer, should be suppressed, in order to improve the durability of silver reflective films and optical information storage media using these silver reflective films.

However, no known technique, except for the technique disclosed in Patent Document 5, has been proposed on a silver alloy reflective film that helps to improve the hygrothermal resistance and light stability of optical discs. Alternatively, known test procedures for evaluation of the hygrothermal resistance and light stability of optical discs using silver alloy reflective films are insufficient for improvements in hygrothermal resistance and light stability.

Specifically, according to known techniques, a single-layer film composed of a silver thin film alone deposited on a substrate made typically of a polycarbonate has been used in tests for evaluation of hygrothermal resistance and light stability of optical discs using silver alloy reflective films. However, the deterioration, where silver in the reflective film migrates and aggregates into a resin layer in direct contact with the reflective layer, cannot occur in the tests using a single-layer film composed of a silver thin film alone deposited on a substrate made typically of a polycarbonate. Accordingly, it is difficult to accurately evaluate the hygrothermal resistance and light stability under the known test conditions using such a single-layer film.

In contrast, for accurately evaluating the environmental resistance of optical information storage media, a test should be conducted under such conditions that the deterioration, where silver diffuses (migrates) and aggregates into a resin layer, can occur by forming a resin layer in contact with a silver alloy film; and changes in reflective properties should be measured and evaluated.

Specifically, an optical information storage medium is prepared as a test sample by sequentially stacking a silver alloy thin film and a resin layer as being in contact with each other on a substrate made typically of a polycarbonate. For the light stability, light with a specific wavelength, such as an ultraviolet ray, is applied to the test sample, a change of reflectivity (change of absolute reflectivity) of the optical information storage medium between before and after the light irradiation is measured, and the light stability is evaluated. For the hygrothermal resistance, the optical information storage medium is placed under moist heat conditions, a change of reflectivity of the optical information storage medium is measured, and the hygrothermal resistance is evaluated. Both the light stability and hygrothermal resistance are necessary for providing satisfactory environmental resistance.

The specific elements selected from Pr, Ho, Yb, Sm, Er, Tm, and Tb contained in the silver alloy reflective films according to the present invention can be said to be selected based on the after mentioned criteria on the light stability and hygrothermal resistance, as distinguished from the types and contents of the other rare-earth elements that do not satisfy the criteria. In other words, when the known tests using a single-layer film of a silver thin film alone arranged on a substrate made typically of a polycarbonate are employed, there occurs no significant difference in environmental resistance between the specific elements selected from Pr, Ho, Yb, Sm, Er, Tm, and Tb as specified in the present invention and the other rare-earth elements. In this view, it can also be said that the superiority of advantages of the specific elements selected from Pr, Ho, Yb, Sm, Er, Tm, and Tb specified in the present invention can be recognized and distinguished from the other elements only by the specific test conditions, where the deterioration can occur, specified in the present invention.

As has been described, reflective properties in an optical information storage medium, where the deterioration can occur, are accurately evaluated, and the compositions of silver alloy reflective films are determined as in the above embodiment according to the present invention. Consequently, the deterioration, where silver diffuses and aggregates into the ultraviolet-curable resin layer, can be suppressed, whereby the silver alloy reflective films for optical information storage media can have improved environmental resistance, including both high hygrothermal resistance and highlight stability, and can maintain the superior environmental resistance, such as high hygrothermal resistance and high light stability, over the long term.

Optical information storage media using these reflective films can be improved in their environmental resistance such as hygrothermal resistance and light stability and can maintain the superior environmental resistance, such as high hygrothermal resistance and high light stability, over the long term. Additionally, sputtering targets for the deposition of reflective films, when being silver alloys having compositions the same as or similar to those of the silver reflective films, enable deposition of silver alloy reflective films according to the present invention, which reflective films have improved environmental resistance such as higher hygrothermal resistance and higher light stability.

REFERENCE NUMERALS

Figure 1:
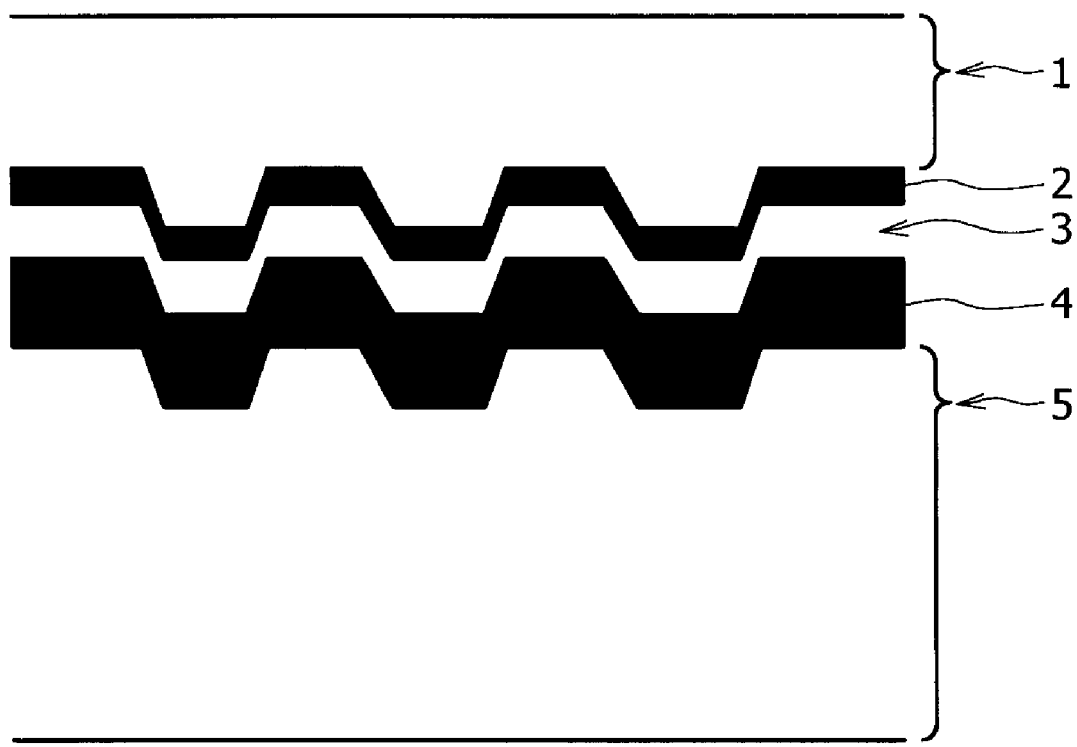
FIG. 1 depicts a schematic view of a cross-sectional structure of a read-only optical disc.

1 polycarbonate substrate
2 semi-reflective film (silver alloy)
3 resin layer
4 fully reflective film (silver alloy)
5 polycarbonate substrate

BEST MODES FOR CARRYING OUT THE INVENTION

Meanings of parameters as specified in the present invention and some embodiments of the present invention will be sequentially illustrated.
(Optical Information Storage Media)

Optical information storage media to which the present invention is applied will be illustrated below. As a consummation, the "optical information storage media" to which the present invention is applied refer to optical discs. Such optical discs can be categorized into several types and are categorized by the writing/reading system into three main types, i.e., read-only, write-once, and rewritable optical discs. Features of the present invention reside in the components and compositions of the reflective films, and structures and configurations of the optical information storage media or optical discs can be selected from among those of commercially available or known optical discs.

Among such optical discs, read-only optical discs have, for example, a structure in which recording data are formed as convex-concave recording pits on a transparent plastic (transparent resin) substrate made typically of a polycarbonate, and a silver alloy reflective film is then deposited thereon. There are other reflective films mainly containing, for example, aluminum (Al) or gold (Au), than those mainly containing silver, however, the present invention is not applied to the other reflective films. Exemplary substrates for use herein include, in addition to resin substrates such as polycarbonate substrates, substrates made typically of glass, aluminum, or carbon.

FIG. 1 depicts a schematic view of an exemplary cross-sectional structure of the read-only optical disc. In FIG. 1, "1" and "5" stand for polycarbonate (PC) substrates, "2" stands for a silver alloy semi-reflective film to which the present invention is applied, "3" stands for an ultraviolet (UV) curable resin adhesive layer, and "4" stands for a silver alloy reflective film (fully reflective film) to which the present invention is applied.

In the read-only optical disc, data are read out by applying a laser beam to the disc and detecting a phase difference or reflectance difference of the applied laser beam. An article including a transparent plastic substrate 5 bearing respective recording pits, and a reflective film 4 arranged on the substrate 5 corresponds to the above-mentioned cross-sectional structure, in which a silver alloy reflective film 4 is deposited on a PC substrate 5, and an ultraviolet (UV) curable resin adhesive layer 3 is applied onto the reflective film 4 via spin-coating.

FIG. 1 depicts an optical disc of a type in which another transparent plastic substrate 1 bearing a semi-reflective film is affixed to the ultraviolet (UV) curable resin adhesive layer 3 so that data recorded in two layers will be read out. With reference to FIG. 1 as a cross-sectional structure, the optical disc of this type is prepared by depositing a silver alloy semi-reflective film 2 on a PC substrate 1, and affixing the semi-reflective film 2, via an ultraviolet (UV) curable resin layer, to the silver alloy reflective film 4 on the PC substrate 5.

(Compositions of Silver Alloy Reflective Films)

The chemical component compositions of silver alloy reflective films according to the present invention will be described below. The silver alloy reflective films according to the present invention contain, as a chemical component composition, a total of 0.1 to 5 atomic percent of one or more elements selected from the group consisting of Pr, Ho, Yb, Sm, Er, Tm, and Tb, with the remainder being silver and inevitable impurities, so as to exhibit basic properties, such as environmental resistance and initial reflectivity, as reflective films for optical information storage media. The reflective films may further selectively contain 0.01 to 1 atomic percent of Bi and/or a total of 0.3 to 5 atomic percent of either one or both of Cu and Au.

Pr, Ho, Yb, Sm, Er, Tm, and Tb:

The specific elements including Pr, Ho, Yb, Sm, Er, Tm, and Tb significantly act to suppress the deterioration, where silver diffuses and aggregates into the ultraviolet-curable resin layer, as supported by Examples mentioned later. In addition, these elements act to maintain the suppressive activity over the long term. Consequently, the silver alloy reflective films can maintain superior environmental resistance, such as high hygrothermal resistance and high light stability, over the long term to thereby improve the "environmental resistance" as used herein.

To exhibit this advantage, a total of 0.1 to 5 atomic percent of one or more selected from Pr, Ho, Yb, Sm, Er, Tm, and Tb is incorporated with silver.

Pr, Ho, Yb, Sm, Er, Tm, and Tb, if contained in an excessively small total content of less than 0.1 atomic percent, may not sufficiently act to suppress the deterioration and to improve the environmental resistance of silver alloy reflective films. The lower limit in total content of elements selected from Pr, Ho, Yb, Sm, Er, Tm, and Tb is thereby set at 0.1 atomic percent.

In contrast, there is no need of containing the elements selected from Pr, Ho, Yb, Sm, Er, Tm, and Tb in a total content of more than 5 atomic percent. These elements, if contained in an excessively large content, may adversely affect basic film properties including reflective properties and semi-reflective properties, such as initial reflectivity. Accordingly, the upper limit of the total content of the elements selected from Pr, Ho, Yb, Sm, Er, Tm, and Tb is set at 5 atomic percent.

The silver alloy reflective films may further contain 0.01 to 1 atomic percent of Bi and/or a total of 0.3 to 5 atomic percent of either one or both of Cu and Au, so as to further improve the environmental resistance.

Bi:

Bismuth (Bi), in a combination use with the specific elements selected from Pr, Ho, Yb, Sm, Er, Tm, and Tb, helps to suppress the deterioration, where silver diffuses and aggregates into the ultraviolet-curable resin layer, and to improve the environmental resistance of the silver alloy reflective films. The content of Bi, if selectively contained, is 0.01 atomic percent or more to exhibit its advantages. However, excess Bi may adversely affect basic properties as reflective films including reflective properties and semi-reflective properties, such as initial reflectivity. There is therefore no need of containing Bi in a content of more than 1 atomic percent.

Cu and Au:

Copper (Cu) and gold (Au), in a combination use with the specific elements selected from Pr, Ho, Yb, Sm, Er, Tm, and Tb, help to suppress the deterioration, where silver diffuses and aggregates into the ultraviolet-curable resin layer, and to improve the environmental resistance of the silver alloy reflective films. The total content of one or both of Cu and Au, if selectively contained, is 0.3 atomic percent or more, to exhibit their advantages. However, excess Cu and/or Au may adversely affect basic properties as reflective films, including reflective properties and semi-reflective properties such as initial reflectivity. There is therefore no need of containing one or both of Cu and Au in a total content of more than 5 atomic percent.

Other elements than the above-mentioned elements in the silver alloy reflective films according to the present invention are basically impurities, and containment of inevitable impurities is acceptable within ranges not adversely affecting the improvements in environmental resistance, which are an object of the present invention, and basic properties as reflective films. Accordingly, the silver alloy reflective films according to the present invention contain the above-mentioned elements, with the remainder being silver and inevitable impurities.

(Deposition of Silver Alloy Reflective Films)

Silver alloy reflective films according to the present invention are deposited by sputtering or vapor-deposition of a silver alloy sputtering target on a substrate made typically of a polycarbonate. In this procedure, silver reflective films having compositions as specified in the present invention are easily obtained by using, as the sputtering target, sputtering targets according to the present invention made of silver alloys having compositions the same as or similar to that of the silver reflective films according to the present invention.

Specifically, a sputtering target for the deposition of a silver alloy reflective film of a silver alloy containing Pr, Ho, Yb, Sm, Er, Tm, and/or Tb preferably contains a total of 0.1 to 5 atomic percent of one or more elements selected from Pr, Ho, Yb, Sm, Er, Tm, and Tb, with the remainder being silver and inevitable impurities, so as to correspond to the content of Pr, Ho, Yb, Sm, Er, Tm, and Tb in the resulting silver alloy reflective film.

To deposit a silver alloy reflective film further selectively containing Bi, the sputtering target is preferably a sputtering target further containing Bi in a content, corresponding to the Bi content of the silver alloy reflective film, of 0.01 to 1.5 atomic percent of Bi, in addition to the elements selected from Pr, Ho, Yb, Sm, Er, Tm, and Tb. In this case, Bi shows such a specific problem that the sputtered Bi is more likely lost and the resulting silver alloy reflective film is liable to have a Bi content lower than that of the sputtering target, with an increasing thickness of the reflective film. To compensate this loss, the Bi content of the target is preferably set greater than that of the silver alloy reflective film, according to the thickness of the reflective film. Accordingly, the upper limit of the Bi content of the target is set greater than the upper limit of the Bi content of the silver alloy reflective film.

To deposit a silver alloy reflective film further selectively containing Cu and/or Au, the sputtering target is preferably a sputtering target further containing a total of 0.3 to 5 atomic percent of either one or both of Cu and Au, in addition to the elements selected from Pr, Ho, Yb, Sm, Er, Tm, and Tb, with or without Bi.

As long as deposition is possible, it is acceptable to use two or more sputtering targets in combination, each containing silver (Ag), the alloy elements such as Pr, Ho, Yb, Sm, Er, Tm, and Tb, and other alloy elements such as Bi, Cu, and Au respectively or in combination, so as to deposit a silver reflective film having the composition as specified in the present invention.

The sputtering or vapor deposition can be conducted according to a suitable procedure known or common as deposition procedures for such thin films. However, direct-current (DC) magnetron sputtering is preferred for stably carrying out deposition.

A sputtering target for use herein may be prepared, for example, by using a silver alloy having a composition the same as or similar to the composition of the silver reflective film specified in the present invention or pure metals composed of the respective alloy elements, or by melting and forging the alloy into a suitable shape such as a plate-like shape, or by forming into a suitable shape such as a plate-like shape via an ingot technique such as spray forming, or via powder metallurgy.

The deposited silver alloy reflective films according to the present invention are further formed to have across-sectional structure and a surface structure necessary for use in the optical information storage media according to the present invention.

(Light Stability Evaluation Test)

Although optical information storage media (optical discs) to which the present invention is applied are categorized into several types as mentioned above, the light stability evaluation tests in the present invention should be carried out under common conditions regardless of the type of the optical information storage media. This is for the purpose of satisfactory reproducibility. In addition, the tests should be conducted under such conditions that the deterioration, where silver diffuses and aggregates into the ultraviolet-curable resin layer, can occur and that whether the environmental resistance is effectively improved to suppress the deterioration over the long term can be detected. Data obtained under these conditions are applicable with good reproducibility as criteria to determine whether the resulting reflective film can be applied to optical information storage media to which the present invention is applied. This is also true for the after-mentioned hygrothermal (moist heat) resistance evaluation test.

In the light stability evaluation test herein, a sample optical information storage medium is prepared by sequentially stacking a silver alloy thin film and an ultraviolet-curable resin layer, as being in contact with each other, on a polycarbonate substrate, the sample is irradiated with light of a shorter wavelength of 405 nm for the next generation optical discs, and with light of a wavelength of 650 nm for current optical discs, for at least 200 hours, and how the reflectively of the optical information storage medium changes after the irradiation is measured.

In the case of a silver alloy thin film (reflective film) serving as a semi-reflective film and having an average film thickness of 15 nm, the reflectivity change of an optical information storage medium with respect to light having a wavelength of 405 nm between before and after the irradiation should be 3.5% or less, and is preferably 2% or less, as criteria for the environmental resistance herein. Likewise, the reflectivity change upon irradiation with light having a wavelength of 650 nm should be 1.5% or less, and is preferably 1.0% or less, as criteria for the environmental resistance.

In the case of a silver alloy thin film (reflective film) serving as a fully reflective film and having an relatively large average film thickness of 60 nm, the reflectivity change of the optical information storage medium with respect to light having a wavelength of 405 nm between before and after the irradiation should be 3% or less, and is preferably 1% or less, as criteria for the light stability as the environmental resistance herein. Likewise, the reflectivity change upon irradiation with light having a wavelength of 650 nm should be 1.0% or less, and is preferably 0.5% or less, as criteria for the light stability as the environmental resistance.

When fluorescent light from a fluorescent lamp is applied to a sample optical information storage medium as an assembly, the reflectivity is measured at wavelengths of 405 nm, which wavelength is used for reading and writing of data in next-generation optical discs (Blue-ray Discs and HD DVDs) and of 650 nm, which wavelength is used for current DVDs, in the light stability evaluation test, as described above. The light stability evaluation test is conducted under such conditions that fluorescent light is applied from a fluorescent lamp placed at a distance of 60 mm from the optical disc, which fluorescent lamp can emit light with the above wavelength and has a color temperature of 6700 K. The test temperature is 25° C.; and the irradiation duration is at least 200 hours as a guide, and a test for a longer irradiation duration than this, such as 400 hours, may be conducted in combination.

The reflectivities of the sample optical information storage medium are measured before and after the irradiation at the wavelengths for reading/writing of data for next-generation optical discs and for current DVDs, using the V-570 Visible/Ultraviolet Spectrometer supplied by JASCO Corporation.

(Hygrothermal Resistance Evaluation Test)

The hygrothermal resistance test is conducted under such conditions that a sample optical information storage medium having the same multilayer structure as that used in the light stability test is prepared, and the storage medium is held under moist heat conditions at a temperature of 80° C. and relative humidity of 90% for at least 200 hours. In the case of a silver alloy thin film (reflective film) serving as a semi-reflective film and having an average film thickness of 15 nm, the reflectivity change (change of absolute reflectivity) of the optical information storage medium with respect to light having a wavelength of 405 nm between before and after holding under the moist heat conditions should be 2% or less, and is preferably 1% or less, as criteria for the environmental resistance herein. Likewise, the reflectivity change upon irradiation with light having a wavelength of 650 nm between before and after holding under the moist heat conditions should be 1% or less, and is preferably 0.5% or less, as criteria for the environmental resistance herein.

In the case of a silver alloy thin film (reflective film) serving as a fully reflective film and having an relatively large average film thickness of 60 nm, the reflectivity change (change of absolute reflectivity) of the optical information storage medium with respect to having a wavelength of nm between before and after holding under the moist heat conditions should be 1% or less, and is preferably 0.5% or less, as criteria for the hygrothermal resistance as the environmental resistance herein. Likewise, the reflectivity change with respect to light having a wavelength of 650 nm between before and after holding under the moist heat conditions should be 0.5% or less and is preferably 0.3% or less, as criteria for the hygrothermal resistance as the environmental resistance herein.

The reflectivities of the sample optical information storage medium are measured before and after exposure to moist heat conditions at the wavelengths for reading/writing of data for next-generation optical discs and for current DVDs, using the V-570 Visible/Ultraviolet Spectrometer supplied by JASCO Corporation, as in the light stability test.

(Other Conditions for Evaluation Tests)

These tests for the evaluation of light stability and hygrothermal resistance preferably use the same optical information storage medium test sample, for the sake of reproducibility. The substrate in the test sample is preferably the same substrate as that in an optical information storage medium (optical disc) to which the present invention will be applied, also for the sake of reproducibility. This is true not only for the type of substrate but also for the size (thickness and diameter) thereof. Typically, when a polycarbonate substrate, which is generally used in optical information storage media, is employed in a test sample, the size of the polycarbonate substrate may be 0.6 to 1.1 mm in thickness and 8 to 12 cm in diameter.

Additionally, the ultraviolet-curable resin layer to be arranged on and brought in contact with the silver alloy reflective film in a test sample is preferably the same as the ultraviolet-curable resin used in an optical information storage medium (optical disc) to which the present invention will be applied, for the sake of reproducibility. This is true not only for the type of the ultraviolet-curable resin but also for the thickness of the ultraviolet-curable resin layer. Typically, the thickness of the ultraviolet-curable resin layer herein may be within a range of 30 to 120 µm, which range is generally employed as the thickness of an ultraviolet-curable resin layer used in combination with a polycarbonate substrate of the above-mentioned read-only type optical disc.

(Initial Reflectivity: Basic Properties)

Optical information storage media (optical discs) to which the present invention is applied should naturally have a high initial reflectivity as a basic property, in addition to the above-mentioned environmental resistance. From this viewpoint, the reflective films according to the present invention preferably have a high initial reflectivity that satisfies this requirement.

The initial reflectivity of a sample optical information storage medium is measured as an absolute reflectivity at the wavelengths for reading/writing of data for current DVDs and for next-generation DVDs, using the V-570 Visible/Ultraviolet Spectrometer supplied by JASCO Corporation.

In the case of a silver alloy thin film (reflective film) serving as a semi-reflective film and having an average film thickness of 15 nm, the thus-measured initial reflectivity should be 20% or more upon irradiation with light having a wavelength of 405 nm, and 58% or more upon irradiation with light having a wavelength of 650 nm, as criteria for acceptable levels of the silver alloy reflective films according to the present invention. In the case of a silver alloy thin film (reflective film) serving as a fully reflective film and having an relatively large average film thickness of 60 nm, the thus-measured initial reflectivity should be 77% or more upon irradiation with light having a wavelength of 405 nm, and 90% or more upon irradiation with light having a wavelength of 650 nm, as criteria for acceptable levels.

Examples

The present invention will be illustrated in further detail with reference to several examples below. Specifically, each of Ag—X alloy thin films in Tables 1 to 16 was deposited on a polycarbonate resin substrate by DC magnetron sputtering, on which an ultraviolet-curable resin layer was further formed to give an assembly, and the durability of the assembly was tested and evaluated. The results of Examples and Comparative Examples are respectively shown in Tables 1 to 16.

Film Compositions of Ag—X Alloy Thin Films:

The film compositions of the respective Ag—X alloy thin films in Tables were determined by inductively coupled plasma (ICP)-mass spectrometry. Specifically, a silver alloy thin film as an analytical sample was dissolved in an acid solution as a 1:1 mixture of nitric acid and pure water, the acid solution was heated on a hot plate at 200° C. until the analytical sample was completely dissolved in the acid solution, the acid solution was then cooled to room temperature, and the amounts of alloy elements contained in the silver alloy thin film were measured using the ICP Mass Spectrometer SPQ-8000 supplied by Seiko Instruments, Inc.

Film Deposition:

In each sample, a polycarbonate resin substrate of 0.6 mm in thickness and 12 cm in diameter was used in common. Targets used in sputtering were prepared by melting and forming alloys having the same compositions with those of the Ag—X alloy thin films in Tables 1 to 16. Each of the Ag—X alloy thin films was deposited to average film thicknesses of 15 nm and 60 nm, respectively. Next, a commercially available ultraviolet-curable resin under the trade name of SK 6500 from Sony Chemical & Information Device Corporation was applied onto the Ag—X alloy thin films to give a layer 50 µm thick thereon to thereby give test samples. The test samples were used for the tests for evaluation of light stability and hygrothermal resistance, respectively.

Each of the Ag—X alloy thin films was deposited using a DC magnetron sputtering system supplied by Unaxis Balzers AG under the trade name of Cube Star under common conditions at a substrate temperature of 22° C., an argon gas pressure of 2 mTorr, a deposition power density of 1 W/cm$^2$, and a back pressure of $5 \times 10^{-6}$ Torr or less. The film thickness was controlled through the deposition time (duration).

The initial reflectivity (percentage (%) to the reflectivity of pure-silver reflective film) and the reflectivity (reflectivity change (%) between before and after the test) in light-stability and hygrothermal resistance tests were measured under the above specific conditions according to the above specific procedures.

Initial Reflectivity:

In Tables 1, 3, 5, 7, 9, 11, 13, and 15, the initial reflectivity was evaluated on a silver alloy thin film (reflective film) serving as a semi-reflective film and having an average film thickness of 15 nm. Upon irradiation with light having a wavelength of 405 nm, a sample having an initial reflectivity of 20% or more was evaluated as "Good", and one having an initial reflectivity of less than 20% was evaluated as "Poor". Upon irradiation with light having a wavelength of 650 nm, a sample having an initial reflectivity of 58% or more was evaluated as "Good", and one having an initial reflectivity of less than 58% was evaluated as "Poor".

In Tables 2, 4, 6, 8, 10, 12, 14, and 16, the initial reflectivity was evaluated on a silver alloy thin film (reflective film) serving as a fully reflective film and having an relatively large average film thickness of 60 nm. Upon irradiation with light having a wavelength of 405 nm, a sample having an initial reflectivity of 77% or more was evaluated as "Good", and one having an initial reflectivity of less than 77% was evaluated as "Poor". Upon irradiation with light having a wavelength of 650 nm, a sample having an initial reflectivity was 90% or more was evaluated as "Good", and one having an initial reflectivity of less than 90% was evaluated as "Poor".

Light Stability:

In Tables 1, 3, 9, and 11, the light stability was evaluated on a silver alloy thin film (reflective film) serving as a semi-reflective film and having an average film thickness of 15 nm. After irradiation with light having a wavelength of 405 nm for 400 hours, a sample having a reflectivity change of less than 2% was evaluated as "Excellent", one having a reflectivity change of from 2% to 3.5% was evaluated as "Good", and one having a reflectivity change of more than 3.5% was evaluated as "Poor". After irradiation with light having a wavelength of 650 nm for 400 hours, a sample having a reflectivity change of less than 1% was evaluated as "Excellent", one having a reflectivity change of from 1% to 1.5% was evaluated as "Good", and one having a reflectivity change of more than 1.5% was evaluated as "Poor".

In Tables 2, 4, 10, 12, the light stability was evaluated on a silver alloy thin film (reflective film) serving as a fully reflective film and having an relatively large average film thickness of 60 nm. After irradiation with light having a wavelength of 405 nm for 400 hours, a sample having a reflectivity change of less than 1% was evaluated as "Excellent", one having a reflectivity change of from 1% to 3% was evaluated as "Good", and one having a reflectivity change of more than 3% was evaluated as "Poor". After irradiation with light having a wavelength of 650 nm for 400 hours, a sample having a reflectivity change of less than 0.5% was evaluated as "Excellent", one having a reflectivity change of from 0.5% to 1% was evaluated as "Good", and one having a reflectivity change of more than 1% was evaluated as "Poor".

Hygrothermal Resistance:

In Tables 5, 7, 13, and 15, the hygrothermal resistance was evaluated on a silver alloy thin film (reflective film) serving as a semi-reflective film and having an average film thickness of 15 nm. After holding under the moist heat conditions for 200 hours, a sample having a reflectivity change with respect to light having a wavelength of 405 nm of less than 1% was evaluated as "Excellent", one having a reflectivity change of from 1% to 2% was evaluated as "Good", and one having a reflectivity change of more than 2% was evaluated as "Poor". After holding under the moist heat conditions for 200 hours, a sample having a reflectivity change with respect to light having a wavelength of 650 nm of less than 0.5% was evaluated as "Excellent", one having a reflectivity change of from 0.5% to 1% was evaluated as "Good", and one having a reflectivity change of more than 1% was evaluated as "Poor".

In Tables 6, 8, 14, 16, the hygrothermal resistance was evaluated on a silver alloy thin film (reflective film) serving as a fully reflective film and having an relatively large average film thickness of 60 nm. After holding under the moist heat conditions for 200 hours, a sample having a reflectivity change upon irradiation with light having a wavelength of 405 nm of less than 0.5% was evaluated as "Excellent", one having a reflectivity change of from 0.5% to 1% was evaluated as "Good", and one having a reflectivity change of more than 1% was evaluated as "Poor". After holding under the moist heat conditions for 200 hours, a sample having a reflectivity change upon irradiation with light having a wavelength of 650 nm of less than 0.3% was evaluated as "Excellent", one having a reflectivity change of from 0.3% to 0.5% was evaluated as "Good", and one having a reflectivity change of more than 0.5% was evaluated as "Poor".

Examples 1-1 to 1-24 in Tables 1 and 5 correspond to Examples 2-1 to 2-24 in Tables 2 and 6, respectively. The both groups are examples having the same reflective film compositions with each other and essentially containing at least one of Pr, Ho, and Yb in a suitable content. In Tables 3, 4, 7, and 8, Comparative Examples 1-1 to 1-3 correspond to Comparative Examples 2-1 to 2-3, and the two groups are comparative examples having the same reflective film compositions with each other and each containing at least one of Pr, Ho, and Yb but in an excessively small amount below the lower limit. Comparative Examples 1-4 to 1-6 correspond to Comparative Examples 2-4 to 2-6, and the two groups are comparative examples having the same reflective film compositions with each other and each containing at least one of Pr, Ho, and Yb but in an excessively high content exceeding the upper limit. Comparative Examples 1-7 to 1-19 correspond to Comparative Examples 2-7 to 2-19, and the two groups are comparative examples having the same reflective film compositions with each other and each containing none of Pr, Ho, and Yb but containing one or more other rare-earth elements such as Nd, Y, Sc, La, Se, Eu, and Dy even though in a suitable content. Comparative Examples 1-20 and 2-20 in Tables 3, 4, 7, and 8 are comparative examples corresponding to the technique disclosed in Patent Document 5 and including Li-containing silver reflective films.

Thus, Examples are superior in the environmental resistance to Comparative Examples, as seen from comparisons of Examples 1-1 to 1-24 and 2-1 to 2-24 in Tables 1 and 2 with Comparative Examples 1-1 to 1-20 and 2-1 to 2-20 in Tables 3 and 4, and comparisons of Examples 1-1 to 1-24 and 2-1 to 2-24 in Tables 5 and 6 with Comparative Examples 1-1 to 1-20 and 2-1 to 2-20 in Tables 7 and 8. Specifically, these examples each essentially containing at least one of Pr, Ho, and Yb in a suitable content show significantly low reflectivity changes in the light stability test and the hygrothermal resistance test and are superior in environmental resistance as compared with the corresponding comparative examples, even though both have equivalent initial reflectivities.

These examples are superior in environmental resistance in terms of light stability and hygrothermal resistance even for a long test period of 200 hours. They are particularly superior in light stability even for a long test period of 400 hours. Additionally, these results are in common between different average film thicknesses of 15 nm (a semi-reflective film) and 60 nm (a fully reflective film) and are in common between different wavelengths of 405 nm and 650 nm of ultraviolet rays to be irradiated.

Examples 3-1 to 3-33 in Tables 9 and 13 correspond to Examples 4-1 to 4-33 in Tables 10 and 14, respectively, and the two groups are examples having the same reflective film compositions with each other and essentially containing at least one of Sm, Er, Tm, and Tb in a suitable content. In Tables 11, 12, 15, and 16, Comparative Examples 3-1 to 3-4 correspond to Comparative Examples 4-1 to 4-4, respectively, and the two groups are comparative examples having the same reflective film compositions with each other and each containing at least one of Sm, Er, Tm, and Tb but in an excessively small amount. Comparative Examples 3-5 to 3-8 correspond to Comparative Examples 4-5 to 4-8, respectively, and the two groups are comparative examples having the same reflective film compositions with each other and each containing at least one of Sm, Er, Tm, and Tb but in an excessively large content exceeding the upper limit. In Tables 11, 12, 15, and 16, Comparative Examples 3-9 to 3-21 correspond to Comparative Examples 4-9 to 4-21, and the two groups are comparative examples having the same reflective film compositions with each other and each containing none of Sm, Er, Tm, and Tb but containing one or more other rare-earth elements such as Nd, Y, Sc, La, Se, Eu, and Dy even though in a suitable content. Comparative Examples 3-22 and 4-22 in Tables 11, 12, 15, and 16 are comparative examples corresponding to the technique disclosed in Patent Document 5 and including Li-containing silver reflective films.

Thus, Examples are superior in the environmental resistance to Comparative Examples, as seen from comparisons of Examples 3-1 to 3-33 and 4-1 to 4-33 in Tables 9 and 10 with Comparative Examples 3-1 to 3-22 and 4-1 to 4-22 in Tables 11 and 12, and comparisons of Examples 3-1 to 3-33 and 4-1 to 4-33 in Tables 13 and 14 with Comparative Examples 3-1 to 3-22 and 4-1 to 4-22 in Tables 15 and 16. Specifically, these examples each essentially containing at least one of Sm, Er, Tm, and Tb in a suitable content show significantly low reflectivity changes in the light stability test and the hygrothermal resistance test and are superior in environmental resistance as compared with the corresponding comparative examples, even though both have equivalent initial reflectivities.

These examples are superior in environmental resistance in terms of light stability and hygrothermal resistance even for a long test period of 200 hours. They are particularly superior in light stability even for a long test period of 400 hours. Additionally, these results are in common between different average film thicknesses of 15 nm (as a semi-reflective film) and 60 nm (as a fully reflective film) and are in common between different wavelengths of 405 nm and 650 nm of light to be irradiated.

Accordingly, the data herein support that the silver alloy reflective films according to Examples 1-1 to 1-24, 2-1 to 2-24, 3-1 to 3-33, and 4-1 to 4-33 are suppressed from the deterioration, where silver in the reflective film migrates and aggregates into the adjacent ultraviolet-curable resin layer, thereby have improved environmental resistance including both high hygrothermal resistance and high light stability, and can maintain the superior environmental resistance over the long term. The types of specific elements, i.e., Pr, Ho, Yb, Sm, Er, Tm, and Tb are selected from among rare-earth elements, and suitable contents thereof are set in the present invention so as to maintain the environmental resistance of reflective films over the long term. The data also support the meanings of the selection and setting.

TABLE 1

| Category | Number | Ag reflective film (average thickness: 15 nm) composition (atomic percent, remainder Ag) | Light stability 1 of Ag reflective film (wavelength 405 nm) | | | | | Light stability 2 of Ag reflective film (wavelength 650 nm) | | | | | Synthetic evaluation |
|---|---|---|---|---|---|---|---|---|---|---|---|---|---|
| | | | Initial Reflectivity (%) | Evaluation | Reflectivity change after 200 hr (%) | Reflectivity change after 400 hr (%) | Evaluation | Initial Reflectivity (%) | Evaluation | Reflectivity change after 200 hr (%) | Reflectivity change after 400 hr (%) | Evaluation | |
| Example | 1-1 | Ag—1Pr | 22.5 | ○ | 1.01 | 2.15 | ○ | 60.8 | ○ | 0.51 | 1.11 | ○ | ○ |
| | 1-2 | Ag—3Pr | 22.0 | ○ | 1.10 | 1.98 | ◎ | 59.2 | ○ | 0.55 | 0.98 | ◎ | ◎ |
| | 1-3 | Ag—5Pr | 21.0 | ○ | 0.99 | 1.85 | ◎ | 58.4 | ○ | 0.50 | 0.90 | ◎ | ◎ |
| | 1-4 | Ag—1Yb | 22.3 | ○ | 1.06 | 2.09 | ○ | 60.9 | ○ | 0.54 | 1.02 | ○ | ○ |
| | 1-5 | Ag—3Yb | 21.6 | ○ | 0.91 | 1.92 | ◎ | 59.4 | ○ | 0.44 | 0.94 | ◎ | ◎ |
| | 1-6 | Ag—5Yb | 20.8 | ○ | 0.95 | 1.81 | ◎ | 58.7 | ○ | 0.49 | 0.87 | ◎ | ◎ |
| | 1-7 | Ag—1Ho | 22.2 | ○ | 1.26 | 2.41 | ○ | 60.7 | ○ | 0.62 | 1.22 | ○ | ○ |
| | 1-8 | Ag—3Ho | 21.9 | ○ | 1.22 | 2.36 | ○ | 59.7 | ○ | 0.61 | 1.21 | ○ | ○ |
| | 1-9 | Ag—5Ho | 20.7 | ○ | 1.18 | 2.32 | ○ | 58.4 | ○ | 0.60 | 1.15 | ○ | ○ |
| | 1-10 | Ag—1Pr—1Bi | 21.2 | ○ | 0.82 | 1.78 | ◎ | 59.6 | ○ | 0.41 | 0.86 | ◎ | ◎ |
| | 1-11 | Ag—1Yb—1Bi | 21.6 | ○ | 0.81 | 1.82 | ◎ | 59.6 | ○ | 0.39 | 0.88 | ◎ | ◎ |
| | 1-12 | Ag—1Ho—1Bi | 21.7 | ○ | 1.02 | 2.29 | ○ | 59.2 | ○ | 0.51 | 1.17 | ○ | ○ |
| | 1-13 | Ag—1Pr—1Cu | 21.9 | ○ | 0.82 | 1.83 | ◎ | 59.5 | ○ | 0.42 | 0.90 | ◎ | ◎ |
| | 1-14 | Ag—1Yb—1Cu | 22.0 | ○ | 0.83 | 1.79 | ◎ | 59.6 | ○ | 0.40 | 0.89 | ◎ | ◎ |
| | 1-15 | Ag—1Ho—1Cu | 21.9 | ○ | 0.98 | 2.17 | ○ | 59.7 | ○ | 0.49 | 1.12 | ○ | ○ |
| | 1-16 | Ag—1Pr—1Au | 21.4 | ○ | 0.79 | 1.76 | ◎ | 59.9 | ○ | 0.39 | 0.89 | ◎ | ◎ |
| | 1-17 | Ag—1Yb—1Au | 21.7 | ○ | 0.81 | 1.77 | ◎ | 59.4 | ○ | 0.39 | 0.91 | ◎ | ◎ |
| | 1-18 | Ag—1Ho—1Au | 21.8 | ○ | 1.12 | 2.14 | ○ | 59.7 | ○ | 0.56 | 1.06 | ○ | ○ |
| | 1-19 | Ag—1Pr—1Yb | 21.3 | ○ | 0.59 | 1.06 | ◎ | 59.3 | ○ | 0.29 | 0.54 | ◎ | ◎ |
| | 1-20 | Ag—1Pr—1Ho | 21.6 | ○ | 0.75 | 1.45 | ◎ | 59.3 | ○ | 0.36 | 0.72 | ◎ | ◎ |
| | 1-21 | Ag—1Yb—1Ho | 21.8 | ○ | 0.72 | 1.39 | ◎ | 59.6 | ○ | 0.36 | 0.68 | ◎ | ◎ |
| | 1-22 | Ag—1Pr—1Yb—1Bi | 21.3 | ○ | 0.39 | 0.77 | ◎ | 59.1 | ○ | 0.20 | 0.37 | ◎ | ◎ |
| | 1-23 | Ag—1Pr—1Yb—1Bi—1Cu | 20.8 | ○ | 0.38 | 0.69 | ◎ | 58.5 | ○ | 0.18 | 0.33 | ◎ | ◎ |
| | 1-24 | Ag—1Pr—1Yb—1Bi—1Au | 21.1 | ○ | 0.37 | 0.65 | ◎ | 58.9 | ○ | 0.15 | 0.32 | ◎ | ◎ |

○: Good
◎: Excellent

TABLE 2

| Category | Number | Ag reflective film (average thickness: 60 nm) composition (atomic percent, remainder Ag) | Light stability 1 of Ag reflective film (wavelength 405 nm) | | | | | Light stability 2 of Ag reflective film (wavelength 650 nm) | | | | | Synthetic evaluation |
|---|---|---|---|---|---|---|---|---|---|---|---|---|---|
| | | | Initial reflectivity (%) | Evaluation | Reflectivity change after 200 hr (%) | Reflectivity change after 400 hr (%) | Evaluation | Initial reflectivity (%) | Evaluation | Reflectivity change after 200 hr (%) | Reflectivity change after 400 hr (%) | Evaluation | |
| Example | 2-1 | Ag—1Pr | 79.6 | ○ | 0.49 | 1.05 | ○ | 95.5 | ○ | 0.24 | 0.50 | ○ | ○ |
| | 2-2 | Ag—3Pr | 79.1 | ○ | 0.57 | 0.98 | ◎ | 93.4 | ○ | 0.29 | 0.47 | ◎ | ◎ |
| | 2-3 | Ag—5Pr | 78.6 | ○ | 0.48 | 0.95 | ◎ | 92.3 | ○ | 0.25 | 0.46 | ◎ | ◎ |
| | 2-4 | Ag—1Yb | 79.3 | ○ | 0.51 | 1.02 | ○ | 95.2 | ○ | 0.26 | 0.52 | ○ | ○ |
| | 2-5 | Ag—3Yb | 78.6 | ○ | 0.44 | 1.00 | ◎ | 94.1 | ○ | 0.22 | 0.49 | ◎ | ◎ |
| | 2-6 | Ag—5Yb | 78.2 | ○ | 0.47 | 0.93 | ◎ | 91.5 | ○ | 0.24 | 0.45 | ◎ | ◎ |
| | 2-7 | Ag—1Ho | 79.7 | ○ | 0.65 | 1.16 | ○ | 95.1 | ○ | 0.32 | 0.59 | ○ | ○ |
| | 2-8 | Ag—3Ho | 79.5 | ○ | 0.62 | 1.21 | ○ | 94.0 | ○ | 0.31 | 0.63 | ○ | ○ |
| | 2-9 | Ag—5Ho | 78.4 | ○ | 0.61 | 1.17 | ○ | 91.9 | ○ | 0.31 | 0.58 | ○ | ○ |
| | 2-10 | Ag—1Pr—1Bi | 78.6 | ○ | 0.40 | 0.92 | ◎ | 93.9 | ○ | 0.20 | 0.46 | ◎ | ◎ |
| | 2-11 | Ag—1Yb—1Bi | 78.3 | ○ | 0.41 | 0.93 | ◎ | 94.6 | ○ | 0.21 | 0.45 | ◎ | ◎ |
| | 2-12 | Ag—1Ho—1Bi | 78.1 | ○ | 0.51 | 1.12 | ○ | 93.9 | ○ | 0.24 | 0.56 | ○ | ○ |
| | 2-13 | Ag—1Pr—1Cu | 78.6 | ○ | 0.41 | 0.91 | ◎ | 94.6 | ○ | 0.21 | 0.45 | ◎ | ◎ |
| | 2-14 | Ag—1Yb—1Cu | 78.2 | ○ | 0.43 | 0.91 | ◎ | 93.2 | ○ | 0.21 | 0.46 | ◎ | ◎ |
| | 2-15 | Ag—1Ho—1Cu | 78.7 | ○ | 0.49 | 1.06 | ○ | 94.1 | ○ | 0.24 | 0.51 | ○ | ○ |
| | 2-16 | Ag—1Pr—1Au | 78.7 | ○ | 0.39 | 0.90 | ◎ | 93.5 | ○ | 0.19 | 0.44 | ◎ | ◎ |
| | 2-17 | Ag—1Yb—1Au | 78.1 | ○ | 0.39 | 0.87 | ◎ | 95.1 | ○ | 0.19 | 0.44 | ◎ | ◎ |
| | 2-18 | Ag—1Ho—1Au | 78.3 | ○ | 0.54 | 1.10 | ○ | 95.5 | ○ | 0.28 | 0.53 | ○ | ○ |
| | 2-19 | Ag—1Pr—1Yb | 78.6 | ○ | 0.29 | 0.53 | ◎ | 94.3 | ○ | 0.15 | 0.26 | ◎ | ◎ |
| | 2-20 | Ag—1Pr—1Ho | 78.7 | ○ | 0.38 | 0.72 | ◎ | 94.1 | ○ | 0.19 | 0.37 | ◎ | ◎ |
| | 2-21 | Ag—1Yb—1Ho | 78.2 | ○ | 0.35 | 0.71 | ◎ | 94.2 | ○ | 0.18 | 0.36 | ◎ | ◎ |
| | 2-22 | Ag—1Pr—1Yb—1Bi | 78.6 | ○ | 0.20 | 0.39 | ◎ | 93.2 | ○ | 0.10 | 0.20 | ◎ | ◎ |
| | 2-23 | Ag—1Pr—1Yb—1Bi—1Cu | 78.4 | ○ | 0.19 | 0.38 | ◎ | 93.1 | ○ | 0.11 | 0.18 | ◎ | ◎ |
| | 2-24 | Ag—1Pr—1Yb—1Bi—1Au | 78.5 | ○ | 0.18 | 0.35 | ◎ | 93.0 | ○ | 0.09 | 0.17 | ◎ | ◎ |

○: Good
◎: Excellent

TABLE 3

| Category | Number | Ag reflective film (average thickness: 15 nm) composition (atomic percent, remainder Ag) | Light stability 1 of Ag reflective film (wavelength 405 nm) | | | | | Light stability 2 of Ag reflective film (wavelength 650 nm) | | | | | Synthetic evaluation |
|---|---|---|---|---|---|---|---|---|---|---|---|---|---|
| | | | Initial reflectivity (%) | Evaluation | Reflectivity change after 200 hr (%) | Reflectivity change after 400 hr (%) | Evaluation | Initial reflectivity (%) | Evaluation | Reflectivity change after 200 hr (%) | Reflectivity change after 400 hr (%) | Evaluation | |
| Comparative Example | 1-1 | Ag—0.05Pr | 22.8 | ○ | 1.65 | 5.21 | × | 60.5 | ○ | 0.88 | 1.80 | × | × |
| | 1-2 | Ag—0.05Yb | 22.8 | ○ | 1.59 | 5.22 | × | 60.7 | ○ | 0.84 | 1.75 | × | × |
| | 1-3 | Ag—0.05Ho | 22.7 | ○ | 1.64 | 5.11 | × | 60.4 | ○ | 0.83 | 1.69 | × | × |
| | 1-4 | Ag—7Pr | 18.9 | × | 0.93 | 1.78 | ◎ | 57.7 | × | 0.48 | 0.91 | ◎ | × |
| | 1-5 | Ag—7Yb | 19.3 | × | 0.91 | 1.79 | ◎ | 57.8 | × | 0.47 | 0.88 | ◎ | × |
| | 1-6 | Ag—7Ho | 19.9 | × | 1.02 | 2.21 | ○ | 57.9 | × | 0.53 | 1.12 | ○ | × |
| | 1-7 | Ag—1Nd | 23.0 | ○ | 1.48 | 4.95 | × | 60.6 | ○ | 0.73 | 2.55 | × | × |
| | 1-8 | Ag—3Nd | 21.1 | ○ | 1.27 | 4.80 | × | 59.5 | ○ | 0.63 | 2.40 | × | × |
| | 1-9 | Ag—5Nd | 20.5 | ○ | 1.26 | 4.39 | × | 58.9 | ○ | 0.65 | 2.19 | × | × |
| | 1-10 | Ag—1Y | 22.9 | ○ | 1.48 | 4.79 | × | 60.6 | ○ | 0.77 | 2.47 | × | × |
| | 1-11 | Ag—3Y | 21.1 | ○ | 1.43 | 4.32 | × | 60.0 | ○ | 0.71 | 2.24 | × | × |
| | 1-12 | Ag—5Y | 20.1 | ○ | 1.33 | 4.10 | × | 58.2 | ○ | 0.68 | 2.06 | × | × |
| | 1-13 | Ag—3Sc | 21.5 | ○ | 1.34 | 4.72 | × | 59.4 | ○ | 0.66 | 1.65 | × | × |
| | 1-14 | Ag—3La | 21.6 | ○ | 1.28 | 4.65 | × | 59.8 | ○ | 0.64 | 1.55 | × | × |
| | 1-15 | Ag—3Se | 21.8 | ○ | 1.26 | 4.55 | × | 58.2 | ○ | 0.62 | 1.56 | × | × |
| | 1-16 | Ag—3Eu | 21.6 | ○ | 1.34 | 4.59 | × | 58.1 | ○ | 0.58 | 1.58 | × | × |
| | 1-17 | Ag—3Dy | 21.9 | ○ | 1.23 | 4.69 | × | 58.6 | ○ | 0.69 | 1.59 | × | × |
| | 1-18 | Ag—3Nd—1Bi—1Cu | 20.5 | ○ | 1.06 | 3.58 | × | 58.5 | ○ | 0.59 | 1.58 | × | × |
| | 1-19 | Ag—3Y—1Bi—1Au | 20.6 | ○ | 1.12 | 3.66 | × | 58.6 | ○ | 0.55 | 1.55 | × | × |
| | 1-20 | Ag—3Li | 21.7 | ○ | 1.16 | 3.89 | × | 58.1 | ○ | 0.75 | 1.66 | × | × |

○: Good
◎: Excellent
×: Poor

TABLE 4

| Category | Number | Ag reflective film (average thickness: 60 nm) composition (atomic percent, remainder Ag) | Light stability 1 of Ag reflective film (wavelength 405 nm) | | | | | Light stability 2 of Ag reflective film (wavelength 650 nm) | | | | | Synthetic evaluation |
|---|---|---|---|---|---|---|---|---|---|---|---|---|---|
| | | | Initial reflectivity (%) | Evaluation | Reflectivity change after 200 hr (%) | Reflectivity change after 400 hr (%) | Evaluation | Initial reflectivity (%) | Evaluation | Reflectivity change after 200 hr (%) | Reflectivity change after 400 hr (%) | Evaluation | |
| Comparative Example | 2-1 | Ag—0.05Pr | 80.1 | ○ | 0.81 | 3.59 | × | 95.7 | ○ | 0.44 | 1.62 | × | × |
| | 2-2 | Ag—0.05Yb | 80.0 | ○ | 0.83 | 3.66 | × | 95.6 | ○ | 0.43 | 1.54 | × | × |
| | 2-3 | Ag—0.05Ho | 80.3 | ○ | 0.81 | 3.87 | × | 95.5 | ○ | 0.46 | 1.56 | × | × |
| | 2-4 | Ag—7Pr | 76.8 | × | 0.48 | 0.90 | ◎ | 89.5 | × | 0.24 | 0.44 | ◎ | × |
| | 2-5 | Ag—7Yb | 76.5 | × | 0.45 | 0.92 | ◎ | 89.0 | × | 0.22 | 0.46 | ◎ | × |
| | 2-6 | Ag—7Ho | 76.2 | × | 0.53 | 1.14 | ○ | 89.2 | × | 0.26 | 0.56 | ○ | × |
| | 2-7 | Ag—1Nd | 80.4 | ○ | 0.76 | 2.48 | ○ | 94.7 | ○ | 0.39 | 1.28 | × | × |
| | 2-8 | Ag—3Nd | 78.8 | ○ | 0.61 | 2.40 | ○ | 94.4 | ○ | 0.31 | 1.23 | × | × |
| | 2-9 | Ag—5Nd | 77.7 | ○ | 0.61 | 2.27 | ○ | 91.5 | ○ | 0.31 | 1.15 | × | × |
| | 2-10 | Ag—1Y | 80.4 | ○ | 0.72 | 2.46 | ○ | 95.1 | ○ | 0.35 | 1.23 | × | × |
| | 2-11 | Ag—3Y | 78.5 | ○ | 0.70 | 2.09 | ○ | 94.3 | ○ | 0.35 | 1.02 | × | × |
| | 2-12 | Ag—5Y | 77.1 | ○ | 0.68 | 2.08 | ○ | 92.1 | ○ | 0.33 | 1.02 | × | × |
| | 2-13 | Ag—3Sc | 78.2 | ○ | 0.65 | 2.41 | ○ | 94.2 | ○ | 0.32 | 1.23 | × | × |
| | 2-14 | Ag—3La | 78.5 | ○ | 0.69 | 2.22 | ○ | 93.8 | ○ | 0.35 | 1.25 | × | × |
| | 2-15 | Ag—3Se | 78.6 | ○ | 0.67 | 2.35 | ○ | 94.5 | ○ | 0.36 | 1.19 | × | × |
| | 2-16 | Ag—3Eu | 78.2 | ○ | 0.66 | 2.32 | ○ | 94.1 | ○ | 0.41 | 1.28 | × | × |
| | 2-17 | Ag—3Dy | 78.3 | ○ | 0.66 | 2.21 | ○ | 93.7 | ○ | 0.39 | 1.25 | × | × |
| | 2-18 | Ag—3Nd—1Bi—1Cu | 78.1 | ○ | 0.48 | 1.02 | ○ | 93.0 | ○ | 0.21 | 1.12 | × | × |
| | 2-19 | Ag—3Y—1Bi—1Au | 78.0 | ○ | 0.53 | 1.06 | ○ | 93.0 | ○ | 0.26 | 1.16 | × | × |
| | 2-20 | Ag—3Li | 78.9 | ○ | 0.55 | 1.24 | ○ | 93.2 | ○ | 0.24 | 1.13 | × | × |

○: Good
◎: Excellent
×: Poor

TABLE 5

| Category | Number | Ag reflective film (average thickness: 15 nm) composition (atomic percent, remainder Ag) | Light stability 1 of Ag reflective film (wavelength 405 nm) | | | | Light stability 2 of Ag reflective film (wavelength 650 nm) | | | | Synthetic evaluation |
|---|---|---|---|---|---|---|---|---|---|---|---|
| | | | Initial reflectivity (%) | Evaluation | Reflectivity change after 200 hr (%) | Evaluation | Initial reflectivity (%) | Evaluation | Reflectivity change after 200 hr (%) | Evaluation | |
| Example | 1-1 | Ag—1Pr | 22.5 | ○ | 1.11 | ◎ | 60.8 | ○ | 0.55 | ○ | ○ |
| | 1-2 | Ag—3Pr | 22.0 | ○ | 0.98 | ◎ | 59.2 | ○ | 0.48 | ◎ | ◎ |
| | 1-3 | Ag—5Pr | 21.0 | ○ | 0.90 | ◎ | 58.4 | ○ | 0.43 | ◎ | ◎ |
| | 1-4 | Ag—1Yb | 22.3 | ○ | 1.01 | ○ | 60.9 | ○ | 0.51 | ○ | ○ |
| | 1-5 | Ag—3Yb | 21.6 | ○ | 0.94 | ◎ | 59.4 | ○ | 0.46 | ◎ | ◎ |
| | 1-6 | Ag—5Yb | 20.8 | ○ | 0.87 | ◎ | 58.7 | ○ | 0.44 | ◎ | ◎ |
| | 1-7 | Ag—1Ho | 22.2 | ○ | 1.22 | ○ | 60.7 | ○ | 0.59 | ○ | ○ |
| | 1-8 | Ag—3Ho | 21.9 | ○ | 1.22 | ○ | 59.7 | ○ | 0.60 | ○ | ○ |
| | 1-9 | Ag—5Ho | 20.7 | ○ | 1.15 | ○ | 58.4 | ○ | 0.59 | ○ | ○ |
| | 1-10 | Ag—1Pr—1Bi | 21.2 | ○ | 0.85 | ◎ | 59.6 | ○ | 0.43 | ◎ | ◎ |
| | 1-11 | Ag—1Yb—1Bi | 21.6 | ○ | 0.89 | ◎ | 59.6 | ○ | 0.45 | ◎ | ◎ |
| | 1-12 | Ag—1Ho—1Bi | 21.7 | ○ | 1.18 | ○ | 59.2 | ○ | 0.59 | ○ | ○ |
| | 1-13 | Ag—1Pr—1Cu | 21.9 | ○ | 0.90 | ◎ | 59.5 | ○ | 0.47 | ◎ | ◎ |
| | 1-14 | Ag—1Yb—1Cu | 22.0 | ○ | 0.90 | ◎ | 59.6 | ○ | 0.46 | ◎ | ◎ |
| | 1-15 | Ag—1Ho—1Cu | 21.9 | ○ | 1.11 | ○ | 59.7 | ○ | 0.55 | ○ | ○ |
| | 1-16 | Ag—1Pr—1Au | 21.4 | ○ | 0.88 | ◎ | 59.9 | ○ | 0.45 | ◎ | ◎ |
| | 1-17 | Ag—1Yb—1Au | 21.7 | ○ | 0.91 | ◎ | 59.4 | ○ | 0.47 | ◎ | ◎ |
| | 1-18 | Ag—1Ho—1Au | 21.8 | ○ | 1.07 | ○ | 59.7 | ○ | 0.52 | ○ | ○ |
| | 1-19 | Ag—1Pr—1Yb | 21.3 | ○ | 0.53 | ◎ | 59.3 | ○ | 0.27 | ◎ | ◎ |
| | 1-20 | Ag—1Pr—1Ho | 21.6 | ○ | 0.72 | ◎ | 59.3 | ○ | 0.37 | ◎ | ◎ |
| | 1-21 | Ag—1Yb—1Ho | 21.8 | ○ | 0.68 | ◎ | 59.6 | ○ | 0.33 | ◎ | ◎ |
| | 1-22 | Ag—1Pr—1Yb—1Bi | 21.3 | ○ | 0.38 | ◎ | 59.1 | ○ | 0.19 | ◎ | ◎ |
| | 1-23 | Ag—1Pr—1Yb—1Bi—1Cu | 21.2 | ○ | 0.35 | ◎ | 58.5 | ○ | 0.18 | ◎ | ◎ |
| | 1-24 | Ag—1Pr—1Yb—1Bi—1Au | 21.2 | ○ | 0.33 | ◎ | 58.6 | ○ | 0.19 | ◎ | ◎ |

○: Good
◎: Excellent

TABLE 6

| | | | Light stability 1 of Ag reflective film (wavelength 405 nm) | | | Light stability 2 of Ag reflective film (wavelength 650 nm) | | | | |
|---|---|---|---|---|---|---|---|---|---|---|
| Category | Number | Ag reflective film (average thickness: 60 nm) composition (atomic percent, remainder Ag) | Initial reflectivity (%) | Evaluation | Reflectivity change after 200 hr (%) | Evaluation | Initial reflectivity (%) | Evaluation | Reflectivity change after 200 hr (%) | Evaluation | Synthetic evaluation |
| Example | 1-1 | Ag—1Pr | 79.6 | ○ | 0.62 | ○ | 95.5 | ○ | 0.36 | ○ | ○ |
| | 1-2 | Ag—3Pr | 79.1 | ○ | 0.49 | ◎ | 93.4 | ○ | 0.29 | ◎ | ◎ |
| | 1-3 | Ag—5Pr | 78.6 | ○ | 0.47 | ◎ | 92.3 | ○ | 0.27 | ◎ | ◎ |
| | 1-4 | Ag—1Yb | 79.3 | ○ | 0.67 | ○ | 95.2 | ○ | 0.35 | ○ | ○ |
| | 1-5 | Ag—3Yb | 78.6 | ○ | 0.48 | ◎ | 94.1 | ○ | 0.29 | ◎ | ◎ |
| | 1-6 | Ag—5Yb | 78.2 | ○ | 0.44 | ◎ | 91.5 | ○ | 0.27 | ◎ | ◎ |
| | 1-7 | Ag—1Ho | 79.7 | ○ | 0.81 | ○ | 95.1 | ○ | 0.41 | ○ | ○ |
| | 1-8 | Ag—3Ho | 79.5 | ○ | 0.78 | ○ | 94.0 | ○ | 0.38 | ○ | ○ |
| | 1-9 | Ag—5Ho | 78.4 | ○ | 0.73 | ○ | 91.9 | ○ | 0.37 | ○ | ○ |
| | 1-10 | Ag—1Pr—1Bi | 78.6 | ○ | 0.48 | ◎ | 93.9 | ○ | 0.26 | ◎ | ◎ |
| | 1-11 | Ag—1Yb—1Bi | 78.3 | ○ | 0.47 | ◎ | 94.6 | ○ | 0.28 | ◎ | ◎ |
| | 1-12 | Ag—1Ho—1Bi | 78.1 | ○ | 0.68 | ○ | 93.9 | ○ | 0.40 | ○ | ○ |
| | 1-13 | Ag—1Pr—1Cu | 78.6 | ○ | 0.49 | ◎ | 94.6 | ○ | 0.29 | ◎ | ◎ |
| | 1-14 | Ag—1Yb—1Cu | 78.2 | ○ | 0.46 | ◎ | 93.2 | ○ | 0.29 | ◎ | ◎ |
| | 1-15 | Ag—1Ho—1Cu | 78.7 | ○ | 0.68 | ○ | 94.1 | ○ | 0.36 | ○ | ○ |
| | 1-16 | Ag—1Pr—1Au | 78.7 | ○ | 0.48 | ◎ | 93.5 | ○ | 0.28 | ◎ | ◎ |
| | 1-17 | Ag—1Yb—1Au | 78.1 | ○ | 0.47 | ◎ | 95.1 | ○ | 0.29 | ◎ | ◎ |
| | 1-18 | Ag—1Ho—1Au | 78.3 | ○ | 0.68 | ○ | 95.5 | ○ | 0.34 | ○ | ○ |
| | 1-19 | Ag—1Pr—1Yb | 78.6 | ○ | 0.35 | ◎ | 94.3 | ○ | 0.17 | ◎ | ◎ |
| | 1-20 | Ag—1Pr—1Ho | 78.7 | ○ | 0.36 | ◎ | 94.1 | ○ | 0.25 | ◎ | ◎ |
| | 1-21 | Ag—1Yb—1Ho | 78.2 | ○ | 0.35 | ◎ | 94.2 | ○ | 0.21 | ◎ | ◎ |
| | 1-22 | Ag—1Pr—1Yb—1Bi | 78.6 | ○ | 0.24 | ◎ | 93.2 | ○ | 0.12 | ◎ | ◎ |
| | 1-23 | Ag—1Pr—1Yb—1Bi—1Cu | 78.5 | ○ | 0.22 | ◎ | 93.1 | ○ | 0.11 | ◎ | ◎ |
| | 1-24 | Ag—1Pr—1Yb—1Bi—1Au | 78.6 | ○ | 0.21 | ◎ | 93.0 | ○ | 0.10 | ◎ | ◎ |

○: Good
◎: Excellent

TABLE 7

| | | | Light stability 1 of Ag reflective film (wavelength 405 nm) | | | Light stability 2 of Ag reflective film (wavelength 650 nm) | | | | |
|---|---|---|---|---|---|---|---|---|---|---|
| Category | Number | Ag reflective film (average thickness: 15 nm) composition (atomic percent, remainder Ag) | Initial reflectivity (%) | Evaluation | Reflectivity change after 200 hr (%) | Evaluation | Initial reflectivity (%) | Evaluation | Reflectivity change after 200 hr (%) | Evaluation | Synthetic evaluation |
| Comparative Example | 1-1 | Ag—0.05Pr | 22.8 | ○ | 2.86 | × | 60.5 | ○ | 1.56 | × | × |
| | 1-2 | Ag—0.05Yb | 22.7 | ○ | 2.87 | × | 60.7 | ○ | 1.45 | × | × |
| | 1-3 | Ag—0.05Ho | 22.8 | ○ | 2.79 | × | 60.7 | ○ | 1.48 | × | × |
| | 1-4 | Ag—7Pr | 18.9 | × | 0.92 | ◎ | 57.7 | × | 0.46 | ◎ | × |
| | 1-5 | Ag—7Yb | 19.3 | × | 0.88 | ◎ | 57.8 | × | 0.45 | ◎ | × |
| | 1-6 | Ag—7Ho | 19.9 | × | 1.11 | ○ | 57.9 | × | 0.56 | ○ | × |
| | 1-7 | Ag—1Nd | 22.5 | ○ | 2.56 | × | 60.1 | ○ | 1.24 | × | × |
| | 1-8 | Ag—3Nd | 21.1 | ○ | 2.42 | × | 59.5 | ○ | 1.25 | × | × |
| | 1-9 | Ag—5Nd | 20.5 | ○ | 2.21 | × | 58.9 | ○ | 1.14 | × | × |
| | 1-10 | Ag—1Y | 22.9 | ○ | 2.46 | × | 60.1 | ○ | 1.21 | × | × |
| | 1-11 | Ag—3Y | 21.1 | ○ | 2.25 | × | 60.0 | ○ | 1.14 | × | × |
| | 1-12 | Ag—5Y | 20.1 | ○ | 2.08 | × | 58.2 | ○ | 1.06 | × | × |
| | 1-13 | Ag—3Sc | 21.3 | ○ | 2.41 | × | 59.2 | ○ | 1.23 | × | × |
| | 1-14 | Ag—3La | 21.2 | ○ | 2.43 | × | 59.4 | ○ | 1.25 | × | × |
| | 1-15 | Ag—3Se | 21.5 | ○ | 2.39 | × | 59.4 | ○ | 1.32 | × | × |
| | 1-16 | Ag—3Eu | 20.9 | ○ | 2.34 | × | 59.6 | ○ | 1.26 | × | × |
| | 1-17 | Ag—3Dy | 21.5 | ○ | 2.45 | × | 59.5 | ○ | 1.24 | × | × |
| | 1-18 | Ag—3Nd—1Bi—1Cu | 21.5 | ○ | 2.21 | × | 58.4 | ○ | 1.12 | × | × |
| | 1-19 | Ag—3Y—1Bi—1Au | 21.2 | ○ | 2.32 | × | 58.6 | ○ | 1.21 | × | × |
| | 1-20 | Ag—3Li | 21.3 | ○ | 2.54 | × | 59.4 | ○ | 1.36 | × | × |

○: Good
◎: Excellent
×: Poor

TABLE 8

| Category | Number | Ag reflective film (average thickness: 60 nm) composition (atomic percent, remainder Ag) | Light stability 1 of Ag reflective film (wavelength 405 nm) | | | | Light stability 2 of Ag reflective film (wavelength 650 nm) | | | | Synthetic evaluation |
|---|---|---|---|---|---|---|---|---|---|---|---|
| | | | Initial reflectivity (%) | Evaluation | Reflectivity change after 200 hr (%) | Evaluation | Initial reflectivity (%) | Evaluation | Reflectivity change after 200 hr (%) | Evaluation | |
| Comparative Example | 2-1 | Ag—0.05Pr | 80.5 | ○ | 1.89 | × | 95.7 | ○ | 0.95 | × | × |
| | 2-2 | Ag—0.05Yb | 80.2 | ○ | 1.87 | × | 95.6 | ○ | 0.99 | × | × |
| | 2-3 | Ag—0.05Ho | 80.6 | ○ | 1.79 | × | 95.6 | ○ | 0.97 | × | × |
| | 2-4 | Ag—7Pr | 76.8 | × | 0.42 | ◎ | 89.5 | × | 0.29 | ◎ | × |
| | 2-5 | Ag—7Yb | 76.5 | × | 0.46 | ◎ | 89 | × | 0.27 | ◎ | × |
| | 2-6 | Ag—7Ho | 76.2 | × | 0.62 | ○ | 89.2 | × | 0.34 | ○ | × |
| | 2-7 | Ag—1Nd | 79.5 | ○ | 1.64 | × | 94.7 | ○ | 0.83 | × | × |
| | 2-8 | Ag—3Nd | 78.8 | ○ | 1.59 | × | 94.4 | ○ | 0.8 | × | × |
| | 2-9 | Ag—5Nd | 77.7 | ○ | 1.39 | × | 91.5 | ○ | 0.71 | × | × |
| | 2-10 | Ag—1Y | 79.4 | ○ | 1.57 | × | 95.1 | ○ | 0.78 | × | × |
| | 2-11 | Ag—3Y | 78.5 | ○ | 1.49 | × | 94.3 | ○ | 0.76 | × | × |
| | 2-12 | Ag—5Y | 77.1 | ○ | 1.28 | × | 92.1 | ○ | 0.64 | × | × |
| | 2-13 | Ag—3Sc | 78.5 | ○ | 1.56 | × | 94.2 | ○ | 0.82 | × | × |
| | 2-14 | Ag—3La | 78.1 | ○ | 1.55 | × | 94.3 | ○ | 0.79 | × | × |
| | 2-15 | Ag—3Se | 78.6 | ○ | 1.49 | × | 94.6 | ○ | 0.75 | × | × |
| | 2-16 | Ag—3Eu | 78.4 | ○ | 1.52 | × | 94.7 | ○ | 0.86 | × | × |
| | 2-17 | Ag—3Dy | 78.3 | ○ | 1.53 | × | 94.1 | ○ | 0.78 | × | × |
| | 2-18 | Ag—3Nd—1Bi—1Cu | 78.2 | ○ | 1.21 | × | 93.1 | ○ | 0.65 | × | × |
| | 2-19 | Ag—3Y—1Bi—1Au | 78.3 | ○ | 1.22 | × | 93.4 | ○ | 0.61 | × | × |
| | 2-20 | Ag—3Li | 78.6 | ○ | 1.38 | × | 94.2 | ○ | 0.67 | × | × |

○: Good
◻: Excellent
×: Poor

TABLE 9

| Category | Number | Ag reflective film (average thickness: 15 nm) composition (atomic percent, remainder Ag) | Light stability 1 of Ag reflective film (wavelength 405 nm) | | | | | | Light stability 2 of Ag reflective film (wavelength 650 nm) | | | | | | Synthetic evaluation |
|---|---|---|---|---|---|---|---|---|---|---|---|---|---|---|---|
| | | | Initial reflectivity (%) | Evaluation | Reflectivity change after 200 hr (%) | Reflectivity change after 400 hr (%) | Evaluation | | Initial reflectivity (%) | Evaluation | Reflectivity change after 200 hr (%) | Reflectivity change after 400 hr (%) | Evaluation | | |
| Example | 3-1 | Ag—1Sm | 22.2 | ○ | 1.55 | 2.86 | ○ | | 61.0 | ○ | 0.78 | 1.44 | ○ | | ○ |
| | 3-2 | Ag—3Sm | 21.7 | ○ | 1.34 | 2.77 | ○ | | 59.9 | ○ | 0.69 | 1.43 | ○ | | ○ |
| | 3-3 | Ag—5Sm | 20.5 | ○ | 1.33 | 2.63 | ○ | | 58.1 | ○ | 0.66 | 1.41 | ○ | | ○ |
| | 3-4 | Ag—1Tb | 23.0 | ○ | 1.28 | 2.79 | ○ | | 60.2 | ○ | 0.62 | 1.42 | ○ | | ○ |
| | 3-5 | Ag—3Tb | 21.2 | ○ | 1.36 | 2.74 | ○ | | 59.6 | ○ | 0.67 | 1.38 | ○ | | ○ |
| | 3-6 | Ag—5Tb | 20.6 | ○ | 1.27 | 2.60 | ○ | | 58.2 | ○ | 0.62 | 1.26 | ○ | | ○ |
| | 3-7 | Ag—1Er | 22.1 | ○ | 1.48 | 2.79 | ○ | | 60.1 | ○ | 0.72 | 1.41 | ○ | | ○ |
| | 3-8 | Ag—3Er | 21.3 | ○ | 1.30 | 2.62 | ○ | | 59.5 | ○ | 0.66 | 1.34 | ○ | | ○ |
| | 3-9 | Ag—5Er | 20.3 | ○ | 1.38 | 2.59 | ○ | | 58.1 | ○ | 0.67 | 1.34 | ○ | | ○ |
| | 3-10 | Ag—1Tm | 22.8 | ○ | 1.28 | 2.72 | ○ | | 60.5 | ○ | 0.66 | 1.31 | ○ | | ○ |
| | 3-11 | Ag—3Tm | 21.3 | ○ | 1.32 | 2.67 | ○ | | 59.5 | ○ | 0.66 | 1.38 | ○ | | ○ |
| | 3-12 | Ag—5Tm | 20.5 | ○ | 1.28 | 2.55 | ○ | | 58.6 | ○ | 0.62 | 1.26 | ○ | | ○ |
| | 3-13 | Ag—1Er—1Bi | 21.2 | ○ | 1.10 | 2.19 | ○ | | 59.5 | ○ | 0.67 | 1.25 | ○ | | ○ |
| | 3-14 | Ag—1Tb—1Bi | 21.7 | ○ | 1.10 | 2.26 | ○ | | 59.7 | ○ | 0.65 | 1.25 | ○ | | ○ |
| | 3-15 | Ag—1Tm—1Bi | 21.5 | ○ | 1.25 | 2.29 | ○ | | 59.5 | ○ | 0.66 | 1.29 | ○ | | ○ |
| | 3-16 | Ag—1Sm—1Bi | 21.6 | ○ | 1.32 | 2.76 | ○ | | 59.4 | ○ | 0.74 | 1.45 | ○ | | ○ |
| | 3-17 | Ag—1Er—1Cu | 21.9 | ○ | 1.07 | 2.27 | ○ | | 59.0 | ○ | 0.63 | 1.23 | ○ | | ○ |
| | 3-18 | Ag—1Tb—1Cu | 21.1 | ○ | 1.05 | 2.23 | ○ | | 58.9 | ○ | 0.63 | 1.23 | ○ | | ○ |
| | 3-19 | Ag—1Tm—1Cu | 21.3 | ○ | 1.25 | 2.59 | ○ | | 58.6 | ○ | 0.62 | 1.33 | ○ | | ○ |
| | 3-20 | Ag—1Sm—1Cu | 21.4 | ○ | 1.33 | 2.73 | ○ | | 58.2 | ○ | 0.73 | 1.46 | ○ | | ○ |
| | 3-21 | Ag—1Er—1Au | 21.2 | ○ | 1.04 | 2.22 | ○ | | 58.6 | ○ | 0.59 | 1.20 | ○ | | ○ |
| | 3-22 | Ag—1Tb—1Au | 20.8 | ○ | 1.08 | 2.21 | ○ | | 59.0 | ○ | 0.69 | 1.27 | ○ | | ○ |
| | 3-23 | Ag—1Tm—1Au | 21.8 | ○ | 1.39 | 2.56 | ○ | | 59.0 | ○ | 0.61 | 1.32 | ○ | | ○ |
| | 3-24 | Ag—1Sm—1Au | 21.5 | ○ | 1.41 | 2.81 | ○ | | 58.5 | ○ | 0.79 | 1.43 | ○ | | ○ |
| | 3-25 | Ag—1Er—1Tb | 21.1 | ○ | 0.81 | 1.49 | ◎ | | 59.6 | ○ | 0.57 | 0.89 | ◎ | | ◎ |
| | 3-26 | Ag—1Er—1Tm | 20.8 | ○ | 0.99 | 1.91 | ◎ | | 58.6 | ○ | 0.59 | 0.97 | ◎ | | ◎ |
| | 3-27 | Ag—1Tb—1Tm | 21.8 | ○ | 0.99 | 1.87 | ◎ | | 59.1 | ○ | 0.60 | 0.99 | ◎ | | ◎ |
| | 3-28 | Ag—1Er—1Sm | 21.8 | ○ | 1.06 | 2.11 | ○ | | 58.6 | ○ | 0.75 | 1.12 | ○ | | ○ |
| | 3-29 | Ag—1Sm—1Tm | 21.3 | ○ | 1.11 | 2.09 | ○ | | 59.1 | ○ | 0.77 | 1.08 | ○ | | ○ |

TABLE 9-continued

| Category | Number | Ag reflective film (average thickness: 15 nm) composition (atomic percent, remainder Ag) | Light stability 1 of Ag reflective film (wavelength 405 nm) | | | | | Light stability 2 of Ag reflective film (wavelength 650 nm) | | | | | Synthetic evaluation |
|---|---|---|---|---|---|---|---|---|---|---|---|---|---|
| | | | Initial reflectivity (%) | Evaluation | Reflectivity change after 200 hr (%) | Reflectivity change after 400 hr (%) | Evaluation | Initial reflectivity (%) | Evaluation | Reflectivity change after 200 hr (%) | Reflectivity change after 400 hr (%) | Evaluation | |
| | 3-30 | Ag—1Tb—1Sm | 20.9 | ○ | 1.16 | 2.15 | ○ | 58.8 | ○ | 0.81 | 1.09 | ○ | ○ |
| | 3-31 | Ag—1Er—1Tb—1Bi | 21.3 | ○ | 0.68 | 1.18 | ◎ | 59.0 | ○ | 0.40 | 0.76 | ◎ | ◎ |
| | 3-32 | Ag—1Er—1Tb—1Bi—1Cu | 21.7 | ○ | 0.64 | 1.16 | ◎ | 59.3 | ○ | 0.46 | 0.65 | ◎ | ◎ |
| | 3-33 | Ag—1Er—1Tb—1Bi—1Au | 21.3 | ○ | 0.62 | 1.10 | ◎ | 58.9 | ○ | 0.36 | 0.71 | ◎ | ◎ |

○: Good
◎: Excellent

TABLE 10

| Category | Number | Ag reflective film (average thickness: 60 nm) composition (atomic percent, remainder Ag) | Light stability 1 of Ag reflective film (wavelength 405 nm) | | | | | Light stability 2 of Ag reflective film (wavelength 650 nm) | | | | | Synthetic evaluation |
|---|---|---|---|---|---|---|---|---|---|---|---|---|---|
| | | | Initial reflectivity (%) | Evaluation | Reflectivity change after 200 hr (%) | Reflectivity change after 400 hr (%) | Evaluation | Initial reflectivity (%) | Evaluation | Reflectivity change after 200 hr (%) | Reflectivity change after 400 hr (%) | Evaluation | |
| Example | 4-1 | Ag—1Sm | 79.9 | ○ | 0.78 | 1.47 | ○ | 95.2 | ○ | 0.39 | 0.73 | ○ | ○ |
| | 4-2 | Ag—3Sm | 78.2 | ○ | 0.68 | 1.33 | ○ | 94.8 | ○ | 0.33 | 0.69 | ○ | ○ |
| | 4-3 | Ag—5Sm | 78.0 | ○ | 0.66 | 1.36 | ○ | 92.5 | ○ | 0.32 | 0.67 | ○ | ○ |
| | 4-4 | Ag—1Tb | 79.5 | ○ | 0.64 | 1.36 | ○ | 95.1 | ○ | 0.32 | 0.68 | ○ | ○ |
| | 4-5 | Ag—3Tb | 78.5 | ○ | 0.66 | 1.32 | ○ | 93.8 | ○ | 0.32 | 0.66 | ○ | ○ |
| | 4-6 | Ag—5Tb | 78.0 | ○ | 0.65 | 1.29 | ○ | 93.0 | ○ | 0.31 | 0.66 | ○ | ○ |
| | 4-7 | Ag—1Er | 79.3 | ○ | 0.74 | 1.44 | ○ | 94.3 | ○ | 0.37 | 0.70 | ○ | ○ |
| | 4-8 | Ag—3Er | 78.5 | ○ | 0.63 | 1.30 | ○ | 94.1 | ○ | 0.31 | 0.66 | ○ | ○ |
| | 4-9 | Ag—5Er | 78.0 | ○ | 0.71 | 1.27 | ○ | 93.3 | ○ | 0.36 | 0.63 | ○ | ○ |
| | 4-10 | Ag—1Tm | 79.8 | ○ | 0.64 | 1.31 | ○ | 95.5 | ○ | 0.33 | 0.63 | ○ | ○ |
| | 4-11 | Ag—3Tm | 79.0 | ○ | 0.67 | 1.29 | ○ | 94.8 | ○ | 0.33 | 0.66 | ○ | ○ |
| | 4-12 | Ag—5Tm | 78.6 | ○ | 0.65 | 1.31 | ○ | 93.7 | ○ | 0.32 | 0.67 | ○ | ○ |
| | 4-13 | Ag—1Er—1Bi | 78.1 | ○ | 0.63 | 1.13 | ○ | 94.6 | ○ | 0.30 | 0.56 | ○ | ○ |
| | 4-14 | Ag—1Tb—1Bi | 78.1 | ○ | 0.66 | 1.22 | ○ | 93.2 | ○ | 0.28 | 0.51 | ○ | ○ |
| | 4-15 | Ag—1Tm—1Bi | 78.3 | ○ | 0.62 | 1.21 | ○ | 95.2 | ○ | 0.29 | 0.53 | ○ | ○ |
| | 4-16 | Ag—1Sm—1Bi | 78.1 | ○ | 0.73 | 1.37 | ○ | 94.2 | ○ | 0.33 | 0.63 | ○ | ○ |
| | 4-17 | Ag—1Er—1Cu | 78.1 | ○ | 0.67 | 1.20 | ○ | 93.1 | ○ | 0.28 | 0.53 | ○ | ○ |
| | 4-18 | Ag—1Tb—1Cu | 78.7 | ○ | 0.63 | 1.17 | ○ | 93.3 | ○ | 0.27 | 0.53 | ○ | ○ |
| | 4-19 | Ag—1Tm—1Cu | 78.5 | ○ | 0.66 | 1.16 | ○ | 93.1 | ○ | 0.29 | 0.55 | ○ | ○ |
| | 4-20 | Ag—1Sm—1Cu | 78.4 | ○ | 0.78 | 1.31 | ○ | 93.2 | ○ | 0.32 | 0.61 | ○ | ○ |
| | 4-21 | Ag—1Er—1Au | 78.2 | ○ | 0.60 | 1.16 | ○ | 93.2 | ○ | 0.27 | 0.50 | ○ | ○ |
| | 4-22 | Ag—1Tb—1Au | 78.6 | ○ | 0.64 | 1.12 | ○ | 94.2 | ○ | 0.25 | 0.53 | ○ | ○ |
| | 4-23 | Ag—1Tm—1Au | 78.4 | ○ | 0.65 | 1.21 | ○ | 93.1 | ○ | 0.26 | 0.55 | ○ | ○ |
| | 4-24 | Ag—1Sm—1Au | 78.2 | ○ | 0.75 | 1.34 | ○ | 93.1 | ○ | 0.38 | 0.61 | ○ | ○ |
| | 4-25 | Ag—1Er—1Tb | 78.5 | ○ | 0.52 | 0.83 | ◎ | 93.9 | ○ | 0.23 | 0.35 | ◎ | ◎ |
| | 4-26 | Ag—1Er—1Tm | 78.1 | ○ | 0.64 | 0.98 | ◎ | 94.2 | ○ | 0.25 | 0.42 | ◎ | ◎ |
| | 4-27 | Ag—1Tb—1Tm | 78.3 | ○ | 0.62 | 0.96 | ◎ | 94.3 | ○ | 0.25 | 0.42 | ◎ | ◎ |
| | 4-28 | Ag—1Er—1Sm | 78.2 | ○ | 0.72 | 1.12 | ○ | 94.2 | ○ | 0.33 | 0.53 | ○ | ○ |
| | 4-29 | Ag—1Sm—1Tm | 78.1 | ○ | 0.77 | 1.16 | ○ | 94.3 | ○ | 0.31 | 0.56 | ○ | ○ |
| | 4-30 | Ag—1Tb—1Sm | 78.3 | ○ | 0.73 | 1.09 | ○ | 94.1 | ○ | 0.36 | 0.59 | ○ | ○ |
| | 4-31 | Ag—1Er—1Tb—1Bi | 78.2 | ○ | 0.49 | 0.61 | ◎ | 93.2 | ○ | 0.19 | 0.28 | ◎ | ◎ |
| | 4-32 | Ag—1Er—1Tb—1Bi—1Cu | 78.3 | ○ | 0.48 | 0.59 | ◎ | 93.1 | ○ | 0.20 | 0.23 | ◎ | ◎ |
| | 4-33 | Ag—1Er—1Tb—1Bi—1Au | 78.1 | ○ | 0.42 | 0.56 | ◎ | 93.1 | ○ | 0.18 | 0.25 | ◎ | ◎ |

○: Good
◎: Excellent

TABLE 11

| Category | Number | Ag reflective film (average thickness: 15 nm) composition (atomic percent, remainder Ag) | Light stability 1 of Ag reflective film (wavelength 405 nm) | | | | | Light stability 2 of Ag reflective film (wavelength 650 nm) | | | | | Synthetic evaluation |
|---|---|---|---|---|---|---|---|---|---|---|---|---|---|
| | | | Initial reflectivity (%) | Evaluation | Reflectivity change after 200 hr (%) | Reflectivity change after 400 hr (%) | Evaluation | Initial reflectivity (%) | Evaluation | Reflectivity change after 200 hr (%) | Reflectivity change after 400 hr (%) | Evaluation | |
| Comparative Example | 3-1 | Ag—0.05Sm | 22.6 | ○ | 1.63 | 5.34 | × | 60.5 | ○ | 0.82 | 1.92 | × | × |
| | 3-2 | Ag—0.05Tb | 22.5 | ○ | 1.64 | 5.26 | × | 60.5 | ○ | 0.83 | 1.87 | × | × |
| | 3-3 | Ag—0.05Er | 22.7 | ○ | 1.68 | 5.28 | × | 60.7 | ○ | 0.86 | 1.79 | × | × |
| | 3-4 | Ag—0.05Tm | 22.6 | ○ | 1.62 | 5.31 | × | 60.3 | ○ | 0.87 | 1.78 | × | × |
| | 3-5 | Ag—7Sm | 19.0 | × | 1.12 | 2.52 | ○ | 57.2 | × | 0.56 | 1.30 | ○ | × |
| | 3-6 | Ag—7Tb | 18.6 | × | 1.16 | 2.49 | ○ | 57.4 | × | 0.59 | 1.22 | ○ | × |
| | 3-7 | Ag—7Er | 19.7 | × | 1.21 | 2.61 | ○ | 57.3 | × | 0.63 | 1.31 | ○ | × |
| | 3-8 | Ag—7Tm | 18.7 | × | 1.19 | 2.48 | ○ | 57.9 | × | 0.58 | 1.20 | ○ | × |
| | 3-9 | Ag—1Nd | 22.5 | ○ | 1.48 | 4.95 | × | 60.1 | ○ | 0.73 | 2.55 | × | × |
| | 3-10 | Ag—3Nd | 21.1 | ○ | 1.27 | 4.80 | × | 59.5 | ○ | 0.63 | 2.40 | × | × |
| | 3-11 | Ag—5Nd | 20.5 | ○ | 1.26 | 4.39 | × | 58.9 | ○ | 0.65 | 2.19 | × | × |
| | 3-12 | Ag—1Y | 22.1 | ○ | 1.48 | 4.79 | × | 60.1 | ○ | 0.77 | 2.47 | × | × |
| | 3-13 | Ag—3Y | 21.1 | ○ | 1.43 | 4.32 | × | 60.0 | ○ | 0.71 | 2.24 | × | × |
| | 3-14 | Ag—5Y | 20.1 | ○ | 1.33 | 4.10 | × | 58.2 | ○ | 0.68 | 2.06 | × | × |
| | 3-15 | Ag—3Sc | 21.5 | ○ | 1.34 | 4.72 | × | 59.4 | ○ | 0.66 | 1.65 | × | × |
| | 3-16 | Ag—3La | 21.6 | ○ | 1.28 | 4.65 | × | 59.8 | ○ | 0.64 | 1.55 | × | × |
| | 3-17 | Ag—3Se | 21.8 | ○ | 1.26 | 4.55 | × | 58.2 | ○ | 0.62 | 1.56 | × | × |
| | 3-18 | Ag—3Eu | 21.6 | ○ | 1.34 | 4.59 | × | 58.1 | ○ | 0.58 | 1.58 | × | × |
| | 3-19 | Ag—3Dy | 21.9 | ○ | 1.23 | 4.69 | × | 58.6 | ○ | 0.69 | 1.59 | × | × |
| | 3-20 | Ag—3Nd—1Bi—1Cu | 20.5 | ○ | 1.06 | 3.58 | × | 58.5 | ○ | 0.59 | 1.58 | × | × |
| | 3-21 | Ag—3Y—1Bi—1Au | 20.6 | ○ | 1.12 | 3.66 | × | 58.6 | ○ | 0.55 | 1.55 | × | × |
| | 3-22 | Ag—3Li | 21.7 | ○ | 1.16 | 3.89 | × | 58.1 | ○ | 0.75 | 1.66 | × | × |

○: Good
×: Poor

TABLE 12

| Category | Number | Ag reflective film (average thickness: 60 nm) composition (atomic percent, remainder Ag) | Light stability 1 of Ag reflective film (wavelength 405 nm) | | | | | Light stability 2 of Ag reflective film (wavelength 650 nm) | | | | | Synthetic evaluation |
|---|---|---|---|---|---|---|---|---|---|---|---|---|---|
| | | | Initial reflectivity (%) | Evaluation | Reflectivity change after 200 hr (%) | Reflectivity change after 400 hr (%) | Evaluation | Initial reflectivity (%) | Evaluation | Reflectivity change after 200 hr (%) | Reflectivity change after 400 hr (%) | Evaluation | |
| Comparative Example | 4-1 | Ag—0.05Sm | 80.3 | ○ | 0.95 | 3.98 | × | 95.3 | ○ | 0.53 | 1.65 | × | × |
| | 4-2 | Ag—0.05Tb | 80.2 | ○ | 0.85 | 3.68 | × | 95.6 | ○ | 0.42 | 1.56 | × | × |
| | 4-3 | Ag—0.05Er | 80.5 | ○ | 0.83 | 3.67 | × | 95.1 | ○ | 0.46 | 1.55 | × | × |
| | 4-4 | Ag—0.05Tm | 80.1 | ○ | 0.87 | 3.87 | × | 95.4 | ○ | 0.43 | 1.57 | × | × |
| | 4-5 | Ag—7Sm | 75.5 | × | 0.56 | 1.23 | ○ | 88.2 | × | 0.28 | 0.64 | ○ | × |
| | 4-6 | Ag—7Tb | 75.0 | × | 0.57 | 1.23 | ○ | 89.6 | × | 0.28 | 0.60 | ○ | × |
| | 4-7 | Ag—7Er | 76.4 | × | 0.62 | 1.34 | ○ | 89.0 | × | 0.31 | 0.69 | ○ | × |
| | 4-8 | Ag—7Tm | 76.2 | × | 0.58 | 1.20 | ○ | 88.7 | × | 0.29 | 0.58 | ○ | × |
| | 4-9 | Ag—1Nd | 79.5 | ○ | 0.76 | 2.48 | ○ | 94.7 | ○ | 0.39 | 1.28 | × | × |
| | 4-10 | Ag—3Nd | 78.8 | ○ | 0.61 | 2.40 | ○ | 94.4 | ○ | 0.31 | 1.23 | × | × |
| | 4-11 | Ag—5Nd | 77.7 | ○ | 0.61 | 2.27 | ○ | 91.5 | ○ | 0.31 | 1.15 | × | × |
| | 4-12 | Ag—1Y | 79.4 | ○ | 0.72 | 2.46 | ○ | 94.5 | ○ | 0.35 | 1.23 | × | × |
| | 4-13 | Ag—3Y | 78.5 | ○ | 0.70 | 2.09 | ○ | 94.3 | ○ | 0.35 | 1.02 | × | × |
| | 4-14 | Ag—5Y | 77.1 | ○ | 0.68 | 2.08 | ○ | 92.1 | ○ | 0.33 | 1.02 | × | × |
| | 4-15 | Ag—3Sc | 78.2 | ○ | 0.62 | 2.41 | ○ | 94.2 | ○ | 0.32 | 1.23 | × | × |
| | 4-16 | Ag—3La | 78.5 | ○ | 0.69 | 2.22 | ○ | 93.8 | ○ | 0.35 | 1.25 | × | × |
| | 4-17 | Ag—3Se | 78.6 | ○ | 0.67 | 2.35 | ○ | 94.5 | ○ | 0.36 | 1.19 | × | × |
| | 4-18 | Ag—3Eu | 78.2 | ○ | 0.66 | 2.32 | ○ | 94.1 | ○ | 0.41 | 1.28 | × | × |
| | 4-19 | Ag—3Dy | 78.3 | ○ | 0.66 | 2.21 | ○ | 93.7 | ○ | 0.39 | 1.25 | × | × |
| | 4-20 | Ag—3Nd—1Bi—1Cu | 78.1 | ○ | 0.48 | 1.02 | ○ | 93.0 | ○ | 0.21 | 1.12 | × | × |
| | 4-21 | Ag—3Y—1Bi—1Au | 78.0 | ○ | 0.53 | 1.06 | ○ | 93.0 | ○ | 0.26 | 1.16 | × | × |
| | 4-22 | Ag—3Li | 78.9 | ○ | 0.55 | 1.24 | ○ | 93.2 | ○ | 0.24 | 1.13 | × | × |

○: Good
×: Poor

TABLE 13

| Category | Number | Ag reflective film (average thickness: 15 nm) composition (atomic percent, remainder Ag) | Light stability 1 of Ag reflective film (wavelength 405 nm) | | | | Light stability 2 of Ag reflective film (wavelength 650 nm) | | | | Synthetic evaluation |
|---|---|---|---|---|---|---|---|---|---|---|---|
| | | | Initial reflectivity (%) | Evaluation | Reflectivity change after 200 hr (%) | Evaluation | Initial reflectivity (%) | Evaluation | Reflectivity change after 200 hr (%) | Evaluation | |
| Example | 3-1 | Ag—1Sm | 22.2 | ○ | 1.45 | ○ | 61.0 | ○ | 0.72 | ○ | ○ |
| | 3-2 | Ag—3Sm | 21.7 | ○ | 1.43 | ○ | 59.9 | ○ | 0.70 | ○ | ○ |
| | 3-3 | Ag—5Sm | 20.5 | ○ | 1.30 | ○ | 58.1 | ○ | 0.66 | ○ | ○ |
| | 3-4 | Ag—1Tb | 23.0 | ○ | 1.41 | ○ | 60.2 | ○ | 0.70 | ○ | ○ |
| | 3-5 | Ag—3Tb | 21.2 | ○ | 1.39 | ○ | 59.6 | ○ | 0.69 | ○ | ○ |
| | 3-6 | Ag—5Tb | 20.6 | ○ | 1.25 | ○ | 58.2 | ○ | 0.62 | ○ | ○ |
| | 3-7 | Ag—1Er | 22.1 | ○ | 1.42 | ○ | 60.1 | ○ | 0.73 | ○ | ○ |
| | 3-8 | Ag—3Er | 21.3 | ○ | 1.34 | ○ | 59.5 | ○ | 0.65 | ○ | ○ |
| | 3-9 | Ag—5Er | 20.3 | ○ | 1.35 | ○ | 58.1 | ○ | 0.66 | ○ | ○ |
| | 3-10 | Ag—1Tm | 22.8 | ○ | 1.30 | ○ | 60.5 | ○ | 0.66 | ○ | ○ |
| | 3-11 | Ag—3Tm | 21.3 | ○ | 1.38 | ○ | 59.5 | ○ | 0.67 | ○ | ○ |
| | 3-12 | Ag—5Tm | 20.5 | ○ | 1.27 | ○ | 58.6 | ○ | 0.65 | ○ | ○ |
| | 3-13 | Ag—1Er—1Bi | 21.2 | ○ | 1.11 | ○ | 59.5 | ○ | 0.52 | ○ | ○ |
| | 3-14 | Ag—1Tb—1Bi | 21.7 | ○ | 1.15 | ○ | 59.7 | ○ | 0.53 | ○ | ○ |
| | 3-15 | Ag—1Tm—1Bi | 21.5 | ○ | 1.17 | ○ | 59.5 | ○ | 0.54 | ○ | ○ |
| | 3-16 | Ag—1Sm—1Bi | 21.6 | ○ | 1.38 | ○ | 59.4 | ○ | 0.67 | ○ | ○ |
| | 3-17 | Ag—1Er—1Cu | 21.9 | ○ | 1.12 | ○ | 59.0 | ○ | 0.54 | ○ | ○ |
| | 3-18 | Ag—1Tb—1Cu | 21.1 | ○ | 1.13 | ○ | 58.9 | ○ | 0.51 | ○ | ○ |
| | 3-19 | Ag—1Tm—1Cu | 21.3 | ○ | 1.12 | ○ | 58.6 | ○ | 0.51 | ○ | ○ |
| | 3-20 | Ag—1Sm—1Cu | 21.4 | ○ | 1.41 | ○ | 58.2 | ○ | 0.62 | ○ | ○ |
| | 3-21 | Ag—1Er—1Au | 21.2 | ○ | 1.12 | ○ | 58.6 | ○ | 0.51 | ○ | ○ |
| | 3-22 | Ag—1Tb—1Au | 20.8 | ○ | 1.18 | ○ | 59.0 | ○ | 0.53 | ○ | ○ |
| | 3-23 | Ag—1Tm—1Au | 21.8 | ○ | 1.35 | ○ | 59.0 | ○ | 0.58 | ○ | ○ |
| | 3-24 | Ag—1Sm—1Au | 21.5 | ○ | 1.30 | ○ | 58.5 | ○ | 0.57 | ○ | ○ |
| | 3-25 | Ag—1Er—1Tb | 21.1 | ○ | 0.77 | ◎ | 59.6 | ○ | 0.36 | ◎ | ◎ |
| | 3-26 | Ag—1Er—1Tm | 20.8 | ○ | 0.99 | ◎ | 58.6 | ○ | 0.42 | ◎ | ◎ |
| | 3-27 | Ag—1Tb—1Tm | 21.8 | ○ | 0.89 | ◎ | 59.1 | ○ | 0.41 | ◎ | ◎ |
| | 3-28 | Ag—1Er—1Sm | 21.8 | ○ | 1.02 | ○ | 58.6 | ○ | 0.51 | ○ | ○ |
| | 3-29 | Ag—1Sm—1Tm | 21.3 | ○ | 1.21 | ○ | 59.1 | ○ | 0.52 | ○ | ○ |
| | 3-30 | Ag—1Tb—1Sm | 20.9 | ○ | 1.06 | ○ | 58.8 | ○ | 0.56 | ○ | ○ |
| | 3-31 | Ag—1Er—1Tb—1Bi | 21.3 | ○ | 0.58 | ◎ | 59.0 | ○ | 0.29 | ◎ | ◎ |
| | 3-32 | Ag—1Er—1Tb—1Bi—1Cu | 21.7 | ○ | 0.62 | ◎ | 59.3 | ○ | 0.27 | ◎ | ◎ |
| | 3-33 | Ag—1Er—1Tb—1Bi—1Au | 21.3 | ○ | 0.54 | ◎ | 58.9 | ○ | 0.27 | ◎ | ◎ |

○: Good
◎: Excellent

TABLE 14

| Category | Number | Ag reflective film (average thickness: 60 nm) composition (atomic percent, remainder Ag) | Light stability 1 of Ag reflective film (wavelength 405 nm) | | | | Light stability 2 of Ag reflective film (wavelength 650 nm) | | | | Synthetic evaluation |
|---|---|---|---|---|---|---|---|---|---|---|---|
| | | | Initial reflectivity (%) | Evaluation | Reflectivity change after 200 hr (%) | Evaluation | Initial reflectivity (%) | Evaluation | Reflectivity change after 200 hr (%) | Evaluation | |
| Example | 4-1 | Ag—1Sm | 79.9 | ○ | 0.96 | ○ | 95.2 | ○ | 0.48 | ○ | ○ |
| | 4-2 | Ag—3Sm | 78.2 | ○ | 0.89 | ○ | 94.8 | ○ | 0.44 | ○ | ○ |
| | 4-3 | Ag—5Sm | 78.0 | ○ | 0.83 | ○ | 92.5 | ○ | 0.42 | ○ | ○ |
| | 4-4 | Ag—1Tb | 79.5 | ○ | 0.94 | ○ | 95.1 | ○ | 0.47 | ○ | ○ |
| | 4-5 | Ag—3Tb | 78.5 | ○ | 0.86 | ○ | 93.8 | ○ | 0.45 | ○ | ○ |
| | 4-6 | Ag—5Tb | 78.0 | ○ | 0.81 | ○ | 93.0 | ○ | 0.40 | ○ | ○ |
| | 4-7 | Ag—1Er | 79.3 | ○ | 0.94 | ○ | 94.3 | ○ | 0.47 | ○ | ○ |
| | 4-8 | Ag—3Er | 78.5 | ○ | 0.85 | ○ | 94.1 | ○ | 0.42 | ○ | ○ |
| | 4-9 | Ag—5Er | 78.0 | ○ | 0.84 | ○ | 93.3 | ○ | 0.40 | ○ | ○ |
| | 4-10 | Ag—1Tm | 79.8 | ○ | 0.83 | ○ | 95.5 | ○ | 0.42 | ○ | ○ |
| | 4-11 | Ag—3Tm | 79.0 | ○ | 0.89 | ○ | 94.8 | ○ | 0.44 | ○ | ○ |
| | 4-12 | Ag—5Tm | 78.6 | ○ | 0.79 | ○ | 93.7 | ○ | 0.39 | ○ | ○ |
| | 4-13 | Ag—1Er—1Bi | 78.1 | ○ | 0.73 | ○ | 94.6 | ○ | 0.34 | ○ | ○ |
| | 4-14 | Ag—1Tb—1Bi | 78.1 | ○ | 0.77 | ○ | 93.2 | ○ | 0.35 | ○ | ○ |
| | 4-15 | Ag—1Tm—1Bi | 78.3 | ○ | 0.76 | ○ | 95.2 | ○ | 0.35 | ○ | ○ |
| | 4-16 | Ag—1Sm—1Bi | 78.1 | ○ | 0.90 | ○ | 94.2 | ○ | 0.47 | ○ | ○ |
| | 4-17 | Ag—1Er—1Cu | 78.1 | ○ | 0.78 | ○ | 93.1 | ○ | 0.38 | ○ | ○ |

TABLE 14-continued

|  |  |  | Light stability 1 of Ag reflective film (wavelength 405 nm) | | | | Light stability 2 of Ag reflective film (wavelength 650 nm) | | | | |
|---|---|---|---|---|---|---|---|---|---|---|---|
| Category | Number | Ag reflective film (average thickness: 60 nm) composition (atomic percent, remainder Ag) | Initial reflectivity (%) | Evaluation | Reflectivity change after 200 hr (%) | Evaluation | Initial reflectivity (%) | Evaluation | Reflectivity change after 200 hr (%) | Evaluation | Synthetic evaluation |
|  | 4-18 | Ag—1Tb—1Cu | 78.7 | ○ | 0.69 | ○ | 93.3 | ○ | 0.39 | ○ | ○ |
|  | 4-19 | Ag—1Tm—1Cu | 78.5 | ○ | 0.76 | ○ | 93.1 | ○ | 0.37 | ○ | ○ |
|  | 4-20 | Ag—1Sm—1Cu | 78.4 | ○ | 0.89 | ○ | 93.2 | ○ | 0.46 | ○ | ○ |
|  | 4-21 | Ag—1Er—1Au | 78.2 | ○ | 0.71 | ○ | 93.2 | ○ | 0.34 | ○ | ○ |
|  | 4-22 | Ag—1Tb—1Au | 786 | ○ | 0.75 | ○ | 94.2 | ○ | 0.36 | ○ | ○ |
|  | 4-23 | Ag—1Tm—1Au | 78.4 | ○ | 0.74 | ○ | 93.1 | ○ | 0.36 | ○ | ○ |
|  | 4-24 | Ag—1Sm—1Au | 78.2 | ○ | 0.61 | ○ | 93.1 | ○ | 0.43 | ○ | ○ |
|  | 4-25 | Ag—1Er—1Tb | 78.5 | ○ | 0.48 | ◉ | 93.9 | ○ | 0.29 | ◉ | ◉ |
|  | 4-26 | Ag—1Er—1Tm | 78.1 | ○ | 0.45 | ◉ | 94.2 | ○ | 0.28 | ◉ | ◉ |
|  | 4-27 | Ag—1Tb—1Tm | 78.3 | ○ | 0.46 | ◉ | 94.3 | ○ | 0.27 | ◉ | ◉ |
|  | 4-28 | Ag—1Er—1Sm | 78.2 | ○ | 0.76 | ○ | 94.2 | ○ | 0.42 | ○ | ○ |
|  | 4-29 | Ag—1Sm—1Tm | 78.1 | ○ | 0.71 | ○ | 94.3 | ○ | 0.43 | ○ | ○ |
|  | 4-30 | Ag—1Tb—1Sm | 78.3 | ○ | 0.78 | ○ | 94.1 | ○ | 0.41 | ○ | ○ |
|  | 4-31 | Ag—1Er—1Tb—1Bi | 78.2 | ○ | 0.49 | ◉ | 93.2 | ○ | 0.22 | ◉ | ◉ |
|  | 4-32 | Ag—1Er—1Tb—1Bi—1Cu | 78.3 | ○ | 0.49 | ◉ | 93.1 | ○ | 0.19 | ◉ | ◉ |
|  | 4-33 | Ag—1Er—1Tb—1Bi—1Au | 78.1 | ○ | 0.48 | ◉ | 93.1 | ○ | 0.18 | ◉ | ◉ |

○: Good
□: Excellent

TABLE 15

|  |  |  | Light stability 1 of Ag reflective film (wavelength 405 nm) | | | | Light stability 2 of Ag reflective film (wavelength 650 nm) | | | | |
|---|---|---|---|---|---|---|---|---|---|---|---|
| Category | Number | Ag reflective film (average thickness: 15 nm) composition (atomic percent, remainder Ag) | Initial reflectivity (%) | Evaluation | Reflectivity change after 200 hr (%) | Evaluation | Initial reflectivity (%) | Evaluation | Reflectivity change after 200 hr (%) | Evaluation | Synthetic evaluation |
| Comparative Example | 3-1 | Ag—0.05Sm | 22.6 | ○ | 2.98 | × | 60.5 | ○ | 1.55 | × | × |
|  | 3-2 | Ag—0.05Tb | 22.5 | ○ | 2.86 | × | 60.5 | ○ | 1.48 | × | × |
|  | 3-3 | Ag—0.05Er | 22.7 | ○ | 2.87 | × | 60.7 | ○ | 1.49 | × | × |
|  | 3-4 | Ag—0.05Tm | 22.6 | ○ | 2.85 | × | 60.3 | ○ | 1.45 | × | × |
|  | 3-5 | Ag—7Sm | 19.0 | × | 1.31 | ○ | 57.2 | × | 0.66 | ○ | × |
|  | 3-6 | Ag—7Tb | 18.6 | × | 1.22 | ○ | 57.4 | × | 0.60 | ○ | × |
|  | 3-7 | Ag—7Er | 19.7 | × | 1.32 | ○ | 57.3 | × | 0.66 | ○ | × |
|  | 3-8 | Ag—7Tm | 18.7 | × | 1.21 | ○ | 57.9 | × | 0.62 | ○ | × |
|  | 3-9 | Ag—1Nd | 22.5 | ○ | 2.56 | × | 60.1 | ○ | 1.24 | × | × |
|  | 3-10 | Ag—3Nd | 21.1 | ○ | 2.42 | × | 59.5 | ○ | 1.25 | × | × |
|  | 3-11 | Ag—5Nd | 20.5 | ○ | 2.21 | × | 58.9 | ○ | 1.14 | × | × |
|  | 3-12 | Ag—1Y | 22.1 | ○ | 2.46 | × | 60.1 | ○ | 1.21 | × | × |
|  | 3-13 | Ag—3Y | 21.1 | ○ | 2.25 | × | 60.0 | ○ | 1.14 | × | × |
|  | 3-14 | Ag—5Y | 20.1 | ○ | 2.08 | × | 58.2 | ○ | 1.06 | × | × |
|  | 3-15 | Ag—3Sc | 21.5 | ○ | 2.41 | × | 59.4 | ○ | 1.23 | × | × |
|  | 3-16 | Ag—3La | 21.6 | ○ | 2.43 | × | 59.8 | ○ | 1.25 | × | × |
|  | 3-17 | Ag—3Se | 21.8 | ○ | 2.39 | × | 58.2 | ○ | 1.32 | × | × |
|  | 3-18 | Ag—3Eu | 21.6 | ○ | 2.34 | × | 58.1 | ○ | 1.26 | × | × |
|  | 3-19 | Ag—3Dy | 21.9 | ○ | 2.45 | × | 58.6 | ○ | 1.24 | × | × |
|  | 3-20 | Ag—3Nd—1Bi—1Cu | 20.5 | ○ | 2.21 | × | 58.5 | ○ | 1.12 | × | × |
|  | 3-21 | Ag—3Y—1Bi—1Au | 20.6 | ○ | 2.32 | × | 58.6 | ○ | 1.21 | × | × |
|  | 3-22 | Ag—3Li | 21.7 | ○ | 2.54 | × | 58.1 | ○ | 1.36 | × | × |

○: Good
×: Poor

TABLE 16

| Category | Number | Ag reflective film (average thickness: 60 nm) composition (atomic percent, remainder Ag) | Light stability 1 of Ag reflective film (wavelength 405 nm) | | | | Light stability 2 of Ag reflective film (wavelength 650 nm) | | | | Synthetic evaluation |
|---|---|---|---|---|---|---|---|---|---|---|---|
| | | | Initial reflectivity (%) | Evaluation | Reflectivity change after 200 hr (%) | Evaluation | Initial reflectivity (%) | Evaluation | Reflectivity change after 200 hr (%) | Evaluation | |
| Comparative Example | 4-1 | Ag—0.05Sm | 80.3 | ○ | 1.95 | × | 95.3 | ○ | 1.02 | × | × |
| | 4-2 | Ag—0.05Tb | 80.2 | ○ | 1.88 | × | 95.6 | ○ | 0.98 | × | × |
| | 4-3 | Ag—0.05Er | 80.5 | ○ | 1.86 | × | 95.1 | ○ | 0.95 | × | × |
| | 4-4 | Ag—0.05Tm | 80.1 | ○ | 1.89 | × | 95.4 | ○ | 0.99 | × | × |
| | 4-5 | Ag—7Sm | 75.5 | × | 0.82 | ○ | 88.2 | × | 0.39 | ○ | × |
| | 4-6 | Ag—7Tb | 75.0 | × | 0.80 | ○ | 89.6 | × | 0.41 | ○ | × |
| | 4-7 | Ag—7Er | 76.4 | × | 0.88 | ○ | 89.0 | × | 0.43 | ○ | × |
| | 4-8 | Ag—7Tm | 76.2 | × | 0.77 | ○ | 88.7 | × | 0.38 | ○ | × |
| | 4-9 | Ag—1Nd | 79.5 | ○ | 1.64 | × | 94.7 | ○ | 0.83 | × | × |
| | 4-10 | Ag—3Nd | 78.8 | ○ | 1.59 | × | 94.4 | ○ | 0.80 | × | × |
| | 4-11 | Ag—5Nd | 77.7 | ○ | 1.39 | × | 91.5 | ○ | 0.71 | × | × |
| | 4-12 | Ag—1Y | 79.4 | ○ | 1.57 | × | 94.5 | ○ | 0.78 | × | × |
| | 4-13 | Ag—3Y | 78.5 | ○ | 1.49 | × | 94.3 | ○ | 0.76 | × | × |
| | 4-14 | Ag—5Y | 77.1 | ○ | 1.28 | × | 92.1 | ○ | 0.64 | × | × |
| | 4-15 | Ag—3Sc | 78.2 | ○ | 1.56 | × | 94.2 | ○ | 0.82 | × | × |
| | 4-16 | Ag—3La | 78.5 | ○ | 1.55 | × | 93.8 | ○ | 0.79 | × | × |
| | 4-17 | Ag—3Se | 78.6 | ○ | 1.49 | × | 94.5 | ○ | 0.75 | × | × |
| | 4-18 | Ag—3Eu | 782 | ○ | 1.52 | × | 94.1 | ○ | 0.86 | × | × |
| | 4-19 | Ag—3Dy | 78.3 | ○ | 1.53 | × | 93.7 | ○ | 0.78 | × | × |
| | 4-20 | Ag—3Nd—1Bi—1Cu | 78.1 | ○ | 1.21 | × | 93.0 | ○ | 0.65 | × | × |
| | 4-21 | Ag—3Y—1Bi—1Au | 78.0 | ○ | 1.22 | × | 93.0 | ○ | 0.61 | × | × |
| | 4-22 | Ag—3Li | 78.9 | ○ | 1.38 | × | 93.2 | ○ | 0.67 | × | × |

○: Good
x: Poor

INDUSTRIAL APPLICABILITY

According to the present invention, there are provided silver alloy reflective films for optical information storage media, which can maintain superior environmental resistance, such as high hygrothermal resistance and high light stability, over the long term particularly when the metal reflective films are each in direct contact with a resin layer; optical information storage media including the reflective films; and sputtering targets for the deposition of the reflective films. Accordingly, the present invention is advantageous and useful in reflective films, in which the environmental resistance is particularly desirable; optical information storage media using the reflective films; and sputtering targets for the deposition of the reflective films.

While the present invention has been illustrated in detail with reference to specific embodiments, those skilled in the art will recognize that various modifications and changes are possible without departing from the sprit and scope of the present invention. This application is based on Japanese Patent Application filed on Aug. 28, 2006 (Japanese Patent Application No. 2006-230930) and Japanese Patent Application filed on Oct. 25, 2006 (Japanese Patent Application No. 2006-290238), entire contents of which are incorporated herein by reference.

The invention claimed is:

1. A silver alloy reflective film with superior environmental resistance, for optical information storage media, consisting essentially of a total of 0.1 to 5 atomic percent of one or more elements selected from the group consisting of Pr, Ho, Yb, Sm, Er, Tm, and Tb, with the remainder being silver and inevitable impurities; when the silver alloy reflective film contains Sm, the amount of Sm being greater than 1.0 atomic percent and not greater than 5 atomic percent.

2. The silver alloy reflective film for optical information storage media, according to claim 1, wherein the silver alloy reflective film consists of: (a) one or more elements selected from the group consisting of Pr, Ho, and Yb; (b) silver; and (c) inevitable impurities.

3. The silver alloy reflective film for optical information storage media, according to claim 1, wherein the silver alloy reflective film consists of: (a) one or more elements selected from the group consisting of Sm, Er, Tm, and Tb; (b) silver; and (c) inevitable impurities.

4. An optical information storage medium with superior environmental resistance, comprising the silver alloy reflective film of claim 1.

5. The optical information storage medium according to claim 4, which comprises a transparent substrate, a metal reflective film layer as the silver alloy reflective film, and an ultraviolet-curable resin layer or organic dye recording layer in direct contact with the metal reflective film layer.

6. The silver alloy reflective film with superior environmental resistance, for optical information storage media, according to claim 1, wherein the silver alloy reflective film consists essentially of a total of 0.1 to 5 atomic percent of one or more elements selected from the group consisting of Pr, Ho, Yb, Er, Tm, and Tb, with the remainder being silver and inevitable impurities.

7. A silver alloy reflective film with superior environmental resistance, for optical information storage media, consisting essentially of a total of 0.1 to 5 atomic percent of at least two elements selected from the group consisting of Pr, Ho, Yb, Sm, Er, Tm, and Tb, with the remainder being silver and inevitable impurities.

8. A silver alloy reflective film with superior environmental resistance, for optical information storage media, consisting essentially of:

(a) a total of 0.1 to 5 atomic percent of one or more elements selected from the group consisting of Pr, Ho, Yb, Sm, Er, Tm, and Tb; and (b)(i) 0.01 to 1 atomic percent of Bi, (ii) a total of 0.3 to 5 atomic percent of either one or both of Cu and Au, or (iii) mixtures thereof;

with the remainder being silver and inevitable impurities;

when the silver alloy reflective film contains Sm and Cu, the amount of Sm being greater than 1.0 atomic percent and not greater than 5 atomic percent.

9. The silver alloy reflective film with superior environmental resistance, for optical information storage media, according to claim 8, wherein the silver alloy reflective film consists essentially of:

(a) a total of 0.1 to 5 atomic percent of one or more elements selected from the group consisting of Pr, Ho, Yb, Er, Tm, and Tb; and (b)(i) 0.01 to 1 atomic percent of Bi, (ii) a total of 0.3 to 5 atomic percent of either one or both of Cu and Au, or (iii) mixtures thereof;

with the remainder being silver and inevitable impurities.

10. A silver alloy reflective film with superior environmental resistance, for optical information storage media, consisting essentially of:

(a) a total of 0.1 to 5 atomic percent of at least two elements selected from the group consisting of Pr, Ho, Yb, Sm, Er, Tm, and Tb; and (b)(i) 0.01 to 1 atomic percent of Bi, (ii) a total of 0.3 to 5 atomic percent of either one or both of Cu and Au, or (iii) mixtures thereof;

with the remainder being silver and inevitable impurities.

11. A sputtering target consisting essentially of a total of 0.1 to 5 atomic percent of one or more elements selected from the group consisting of Pr, Ho, Yb, Sm, Er, Tm, and Tb, with the remainder being silver and inevitable impurities; when the silver alloy reflective film contains Sm, the amount of Sm being greater than 1.0 atomic percent and not greater than 5 atomic percent.

12. The sputtering target according to claim 11, wherein the sputtering target consists of: (a) one or more elements selected from the group consisting of Pr, Ho, and Yb; (b) silver; and (c) inevitable impurities.

13. The sputtering target according to claim 11, wherein the sputtering target consists of (a) one or more elements selected from the group consisting of Sm, Er, Tm, and Tb; (b) silver; and (c) inevitable impurities.

14. The sputtering target according to claim 11, wherein the sputtering target consists essentially of: (a) a total of 0.1 to 5 atomic percent of one or more elements selected from the group consisting of Pr, Ho, Yb, Er, Tm, and Tb; (b) silver; and (c) inevitable impurities.

15. A sputtering target consisting essentially of a total of 0.1 to 5 atomic percent of at least two elements selected from the group consisting of Pr, Ho, Yb, Sm, Er, Tm, and Tb, with the remainder being silver and inevitable impurities.

16. The sputtering target according to claim 11, for use in the deposition of a silver alloy reflective film for optical information storage media.

17. The sputtering target consisting essentially of:

(a) a total of 0.1 to 5 atomic percent of one or more elements selected from the group consisting of Pr, Ho, Yb, Sm, Er, Tm, and Tb; and (b)(i) 0.01 to 1 atomic percent of Bi, (ii) a total of 0.3 to 5 atomic percent of either one or both of Cu and Au, or (iii) mixtures thereof;

with the remainder being silver and inevitable impurities;

when the silver alloy reflective film contains Sm and Cu, the amount of Sm being greater than 1.0 atomic percent and not greater than 5 atomic percent.

18. The sputtering target according to claim 17, wherein the sputtering target consists essentially of:

(a) a total of 0.1 to 5 atomic percent of one or more elements selected from the group consisting of Pr, Ho, Yb, Er, Tm, and Tb; and (b)(i) 0.01 to 1 atomic percent of Bi, (ii) a total of 0.3 to 5 atomic percent of either one or both of Cu and Au, or (iii) mixtures thereof;

with the remainder being silver and inevitable impurities.

19. The sputtering target consisting essentially of:

(a) a total of 0.1 to 5 atomic percent of at least two elements selected from the group consisting of Pr, Ho, Yb, Sm, Er, Tm, and Tb; and (b)(i) 0.01 to 1 atomic percent of Bi, (ii) a total of 0.3 to 5 atomic percent of either one or both of Cu and Au, or (iii) mixtures thereof;

with the remainder being silver and inevitable impurities.

* * * * *